United States Patent
Ariyoshi et al.

(10) Patent No.: US 7,716,692 B2
(45) Date of Patent: May 11, 2010

(54) DISC DEVICE WITH PARTICULAR LOADING MECHANISM

(75) Inventors: Yuji Ariyoshi, Osaka (JP); Naohisa Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 688 days.

(21) Appl. No.: 11/575,375

(22) PCT Filed: Sep. 21, 2005

(86) PCT No.: PCT/JP2005/017342

§ 371 (c)(1),
(2), (4) Date: Mar. 15, 2007

(87) PCT Pub. No.: WO2006/033334

PCT Pub. Date: Mar. 30, 2006

(65) Prior Publication Data

US 2008/0005754 A1     Jan. 3, 2008

(30) Foreign Application Priority Data

Sep. 21, 2004  (JP)  ............... 2004-272867
Sep. 29, 2004  (JP)  ............... 2004-283895

(51) Int. Cl.
*G11B 17/04*  (2006.01)
*G11B 19/00*  (2006.01)
(52) U.S. Cl. ................... 720/628; 720/622; 720/704
(58) Field of Classification Search ............ 720/627, 720/628, 619–623, 703–704, 616; 360/99.02–99.03, 360/99.06–99.07
See application file for complete search history.

(56) References Cited

U.S. PATENT DOCUMENTS

| | | | |
|---|---|---|---|
| 4,674,079 A * | 6/1987 | Agostini | 720/623 |
| 4,773,056 A | 9/1988 | Ito | |
| 4,979,160 A * | 12/1990 | Araki | 720/621 |
| 5,054,016 A * | 10/1991 | d'Alayer et al. | 720/704 |
| 5,113,388 A * | 5/1992 | Yamada et al. | 720/704 |
| 5,173,893 A * | 12/1992 | Morikawa et al. | 720/621 |
| 5,173,894 A * | 12/1992 | Kido | 720/623 |
| 5,255,255 A * | 10/1993 | Kaneda et al. | 720/621 |
| 6,028,831 A * | 2/2000 | Scholz et al. | 720/621 |
| 6,192,019 B1 * | 2/2001 | Kurokawa et al. | 720/623 |
| 6,222,811 B1 * | 4/2001 | Sakurai et al. | 720/620 |
| 6,272,093 B1 * | 8/2001 | Kurozuka et al. | 720/627 |
| 6,288,982 B1 * | 9/2001 | Kato | 369/30.36 |

(Continued)

FOREIGN PATENT DOCUMENTS

EP             0 434 136 A1      6/1991

(Continued)

*Primary Examiner*—Brian E Miller
(74) *Attorney, Agent, or Firm*—Hamre, Schumann, Mueller & Larson, P.C.

(57) ABSTRACT

A disc device includes the following: a traverse base 5 that can be moved between a recording/reproducing position and a standby position, on which an optical pickup 2 and a turntable 1 are mounted; a front cover 3 including a disc carrying surface 3*a* that carries a disc 4 and an aperture 3*b* that is formed in the disc carrying surface 3*a* and allows the turntable 1 to pass through when the traverse base 5 is moved between the recording/reproducing position and the standby position; and centering members 8 for holding and shifting the disc 4 to a position where the center of the disc 4 is aligned with the center of the turntable 1. The loading of a disc can be performed in an easy and highly flexible manner.

11 Claims, 13 Drawing Sheets

U.S. PATENT DOCUMENTS

| | | | |
|---|---|---|---|
| 4,498,162 A * | 2/1985 | Schatteman | 720/620 |
| 6,314,073 B2 * | 11/2001 | Horie | 720/628 |
| 6,388,974 B1 * | 5/2002 | Kato | 720/627 |
| 6,463,025 B1 * | 10/2002 | Scholz | 720/622 |
| 6,587,406 B1 * | 7/2003 | Nakamichi | 369/30.85 |
| 6,618,340 B1 | 9/2003 | Sawada | |
| 6,655,244 B2 * | 12/2003 | Shiraishi et al. | 82/1.11 |
| 6,826,766 B2 * | 11/2004 | Tuchiya | 720/620 |
| 6,880,160 B1 * | 4/2005 | Lee et al. | 720/623 |
| 6,993,776 B2 * | 1/2006 | Yamanaka et al. | 720/623 |
| 7,140,030 B2 * | 11/2006 | Togawa | 720/623 |
| 7,231,645 B2 * | 6/2007 | Hirano et al. | 720/622 |
| 7,467,395 B2 * | 12/2008 | Omori et al. | 720/622 |
| 2002/0001280 A1 | 1/2002 | Yabushita | |
| 2002/0034146 A1 | 3/2002 | Morinaga | |
| 2002/0044519 A1 * | 4/2002 | Kabasawa | 369/77.1 |
| 2003/0053402 A1 | 3/2003 | Inatani et al. | |
| 2005/0132390 A1 * | 6/2005 | Tokumoto et al. | 720/623 |

FOREIGN PATENT DOCUMENTS

| | | |
|---|---|---|
| JP | 59-201267 A | 11/1984 |
| JP | 4-67712 | 10/1992 |
| JP | 6-111444 A | 4/1994 |
| JP | 9-212969 A | 8/1997 |
| JP | 11-191256 | 7/1999 |
| JP | 2000-322803 A | 11/2000 |
| JP | 2001-052402 A | 2/2001 |
| JP | 2001-101740 | 4/2001 |
| JP | 2002-093014 A | 3/2002 |
| JP | 2003-208742 | 7/2003 |
| JP | 2004-134003 A | 4/2004 |

* cited by examiner

DISC DEVICE WITH PARTICULAR LOADING MECHANISM

TECHNICAL FIELD

The present invention relates to a disc device that can be loaded with a disc used for recording or reproduction such as CD (compact disk) or DVD (digital versatile disk) or with a disc contained in a case, and can record/reproduce various information signals with respect to the disc.

BACKGROUND ART

In recent years, a DVD recorder capable of recording/reproducing information signals with respect to a DVD has begun to be available rapidly. For more widespread use of the DVD recorder in the future, it has been required to develop a disc device that is usable by anyone and aims for high usability such as universal design. To improve the usability of the disc device, a configuration that can facilitate the loading of a disc in the disc device has been proposed.

A conventional disc device generally employs a "tray system" that allows a tray for carrying a disc to slide in and out. In the disc device using the tray system, a disc is placed on the tray that is drawn out of the device, and then the tray is inserted into the device, thereby loading the disc in the disc device.

A conventional disc device will be described below.

The conventional disc device is known, e.g., from Patent Document 1. In the disc device of Patent Document 1, an opening through which a tray slides in and out is formed in a front panel of the disc device. A disc is placed on the tray that is projected from the opening, and then the disc together with the tray is inserted into a predetermined position (where the disc is attached to or detached from a turntable) inside the disc device.

After the insertion of the disc placed on the tray into the device, the disc is attached on the turntable and rotated at the predetermined rate while being sandwiched between the turntable and a clamper. Information signals are recorded/reproduced with respect to the rotating disc.

For reproduction, e.g., a pickup for reading signals is moved to a track position of an information layer of the disc where the information signals are recorded. Subsequently, the pickup irradiates the information layer with a light beam and detects the light beam reflected from the disc, so that the information signals can be reproduced.

Patent Document 1: JP 4(1992)-67712A

DISCLOSURE OF INVENTION

Problem to be Solved by the Invention

In the above conventional configuration, however, the loading of a disc in the disc device requires a series of operations of drawing the tray out of the device, placing a disc on the tray, and returning the tray to the device. Moreover, positioning is necessary when the disc is placed in a recessed portion of the tray to carry the disc. Thus, it is time consuming to load the disc in the disc device, and the disc loading method is less flexible.

The present invention solves the above conventional problems and has an object of providing a disc device into which a disc can be loaded in an easy and highly flexible manner.

Means for Solving Problem

To achieve the object, a disc device of the present invention is capable of recording/reproducing information signals with respect to a disc and includes the following: a traverse base that can be moved between a recording/reproducing position and a standby position, on which an optical pickup for recording/reproducing the information signals with respect to the disc and a turntable for holding and rotating the disc at a position where the optical pickup can record/reproduce the information signals with respect to the disc are mounted; a front cover including a disc carrying surface that carries the disc and an aperture that is formed in the disc carrying surface and allows the turntable to pass through when the traverse base is moved between the recording/reproducing position and the standby position; and centering members for holding and shifting the disc to a position where the center of the disc is aligned with the center of the turntable. The centering members come into contact with the disc so that they are symmetrical about a first plane that contains the center of the turntable and is perpendicular to a disc holding surface of the turntable and a second plane that contains the center of the turntable and is substantially perpendicular to the first plane. Two pairs of the centering members are arranged symmetrically with respect to the first plane. Each pair of the centering members is rotatable symmetrically with respect to the second plane.

EFFECTS OF THE INVENTION

A disc device with the above configuration can have an excellent effect of loading a disc in an easy and highly flexible manner.

DESCRIPTION OF REFERENCE NUMERALS

Figure 1:
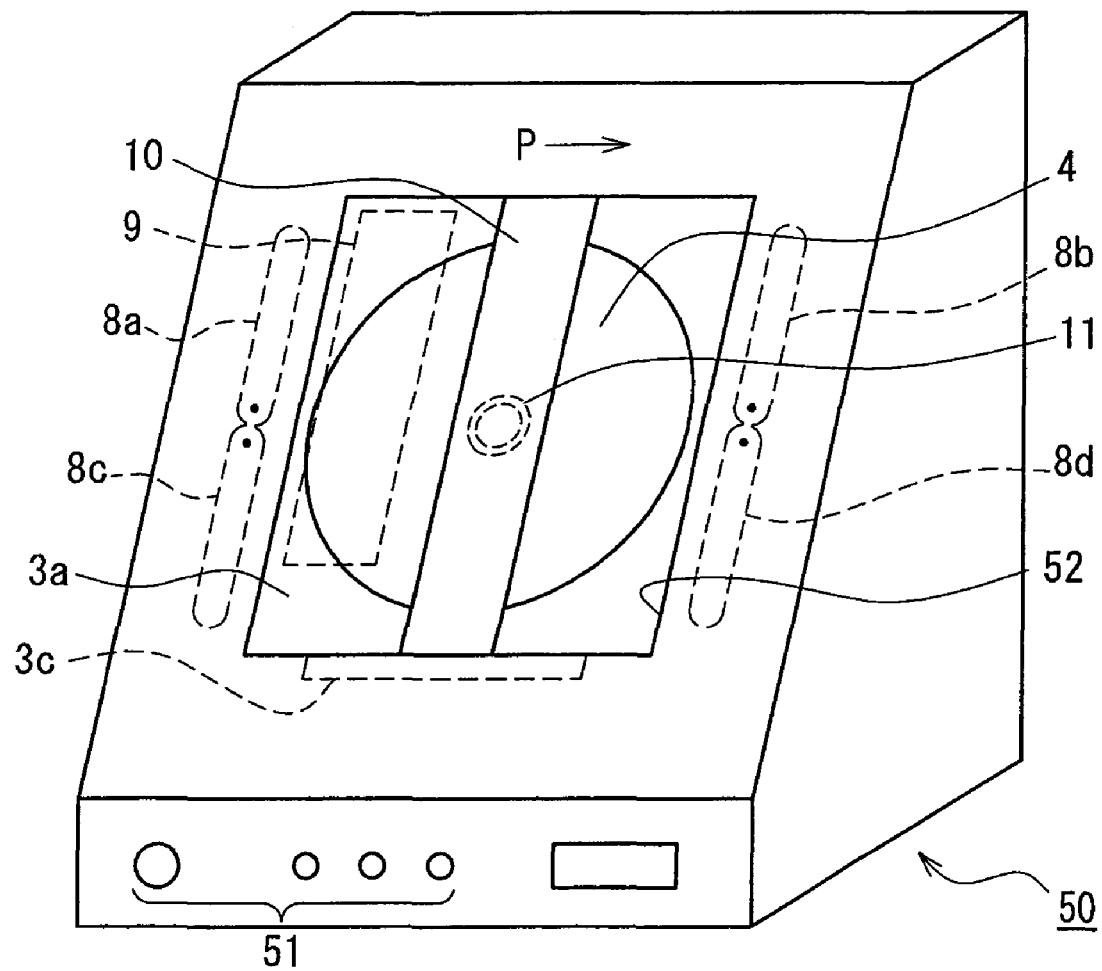
FIG. 1 is a perspective view showing the appearance of a disc system employing a disc device in Embodiment 1 of the present invention in a recordable/reproducible state.

1 Turntable
2 Optical pickup
3 Front cover
3a Disc carrying surface
3b Aperture
3c Rib
4 Disc
5 Traverse base
8 Centering member
8a First centering member
8b Second centering member
8c Third centering member
8d Fourth centering member
9 Open/close member
10 Clamp base
11 Clamper
13a, 13b Spring
14a, 14b Centering adjustment member
16 First rack
17 Second rack
18 Small-diameter disc
19 Cartridge

BEST MODE FOR CARRYING OUT THE INVENTION

In the disc device of the present invention, a gear may be provided in a part of the individual centering members, and the gears of each pair of the centering members may be arranged to engage with each other.

Moreover, each pair of the centering members may be biased with an elastic member in the direction in which the ends of the respective centering members opposed to their rotation centers move toward each other.

The disc device further may include a closing control member for controlling the rotation of each pair of the centering members in the direction in which the centering members are moved toward each other, and an opening control member for controlling the rotation of each pair of the centering members in the direction in which the centering members are moved away from each other.

The disc device further may include a first control member, a second control member, and a driving mechanism for driving the first control member and the second control member. The first control member and the second control member are moved substantially perpendicular to a line containing the center of the turntable and the center of the optical axis of the optical pickup and in opposite directions with respect to the line. In this configuration, the centering members may include a first pair of the centering members and a second pair of the centering members that come into contact with the disc so that the centering members are symmetrical about a first plane that contains the center of the turntable and the center of the optical pickup and is perpendicular to the disc holding surface of the turntable and a second plane that contains the center of the turntable and is substantially perpendicular to the first plane. The first and second pairs of the centering members may be arranged symmetrically with respect to the first plane. Each of the first and second pairs of the centering members may be rotatable symmetrically with respect to the second plane. The first control member and the second control member may be movable between a first position and a second position located opposite to the first position. At the first position, the first control member controls the rotation of the first pair of the centering members in the centering direction while the second control member controls the rotation of the second pair of the centering members in the centering direction. At the second position, the first control member controls the rotation of the second pair of the centering members in the direction away from the disc while the second control member controls the rotation of the first pair of the centering members in the direction away from the disc.

In this configuration, a gear may be provided in a part of the individual centering members, and the gears of each pair of the centering members may be arranged to engage with each other.

Moreover, each pair of the centering members may be biased with an elastic member in the direction in which the ends of the respective centering members opposed to their rotations centers move toward each other.

The disc device further may include centering adjustment members, each of which has a gear engaged with the gear of one of the centering members of each pair. The control members may come into contact with the centering adjustment members to control the rotation of the centering adjustment members, thus controlling the rotation of the centering members.

In this configuration, the gears of the centering adjustment members may have a larger pitch circle diameter than the gears of the centering members.

The disc device further may include an open/close member that can cover/uncover the aperture. The open/close member may open and close in relation to the movement of the first or second control member.

Moreover, the first or second control member may have a cam groove, and a pin may be formed in the traverse base and movably engaged with the cam groove. The cam groove may be formed so that the traverse base is moved between the recording/reproducing position and the standby position in relation to the movement of the first or second control member.

Embodiment 1

First, the configuration of a disc system including a disc device of the present invention will be described.

Figure 2:
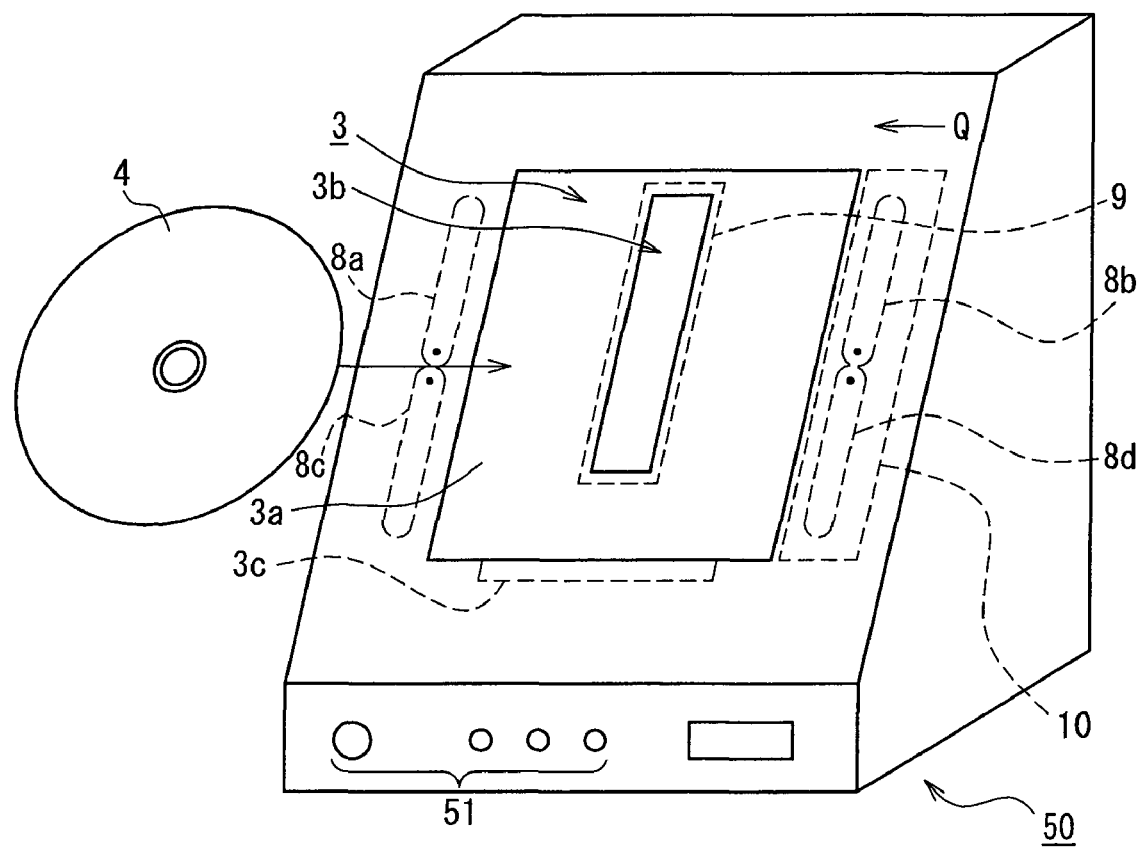
FIG. 2 is a perspective view showing the appearance of the disc system in Embodiment 1 in a disc loadable state.

FIGS. 1 and 2 are perspective views showing the appearance of the disc system. FIG. 1 shows a recordable/reproducible state and FIG. 2 shows a disc loadable state. In the "recordable/reproducible state", a disc 4 is clamped with a turntable and a clamper (neither is shown), and information signals can be recorded/reproduced with respect to the disc 4. In the "disc loadable state", a clamp base 10 (which will be described later) is withdrawn to a position that cannot be seen from the outside, and a user can insert/remove the disc 4 into/from the device.

In FIGS. 1 and 2, the disc system 50 is a stationary disc player or disc recorder and has an opening 52 at the front. A disc device that clamps a disc and can record/reproduce the information signals with respect to the disc, as will be described later, is placed in a vertical position inside an outer cover provided with the opening 52. The user can put the disc 4 into the disc device through the opening 52.

A control portion 51 for performing various operations of the disc system 50 is provided near the opening 52 of the disc system 50. The operations performed by the control portion 51 may be, e.g., a reproduction operation of reproducing the information signals recorded on the disc 4, a recording operation of recording the information signals on the disc 4, and an ejection operation of shifting the disc 4 from the recordable/ reproducible state to the disc loadable state, but are not limited thereto.

A front cover 3 supports the disc 4 in the opening 52 of the disc system 50 when the disc 4 is inserted into the disc device by the user. The front cover 3 includes a disc carrying surface 3a, an aperture 3b for exposing a turntable 1 and an optical pickup 2 (see FIGS. 3 and 4) that are located at the back of the disc carrying surface 3a, and a rib 3c for controlling the position of the disc 4 in a downward direction. While the disc 4 is loaded in the disc device, a part of the recording surface is supported by the disc carrying surface 3a, and a part (lower edge) of the outer circumference is supported by the rib 3c.

Centering members 8a to 8d can turn around their axes 8e. Moreover, the centering members 8a to 8d hold the edge of the disc 4 and center the disc 4 during the period between the placement of the disc 4 on the rib 3c and the recordable/ reproducible state of FIG. 1. The "centering" means that the position of the disc 4 is adjusted so that the center of the disc 4 is aligned with the center of the turntable 1. After the disc 4 is clamped, the centering members 8a to 8d are separated from the edge of the disc 4 and on standby at the respective positions, as shown in FIG. 1. In the disc loadable state of FIG. 2, the centering members 8a to 8d are withdrawn to positions that cannot be seen from the opening 52.

An open/close member 9 is a substantially plate-shaped member and has a principal surface large enough to cover the aperture 3b. The open/close member 9 is located at the back of the disc carrying surface 3a and movable in either direction of the arrow P or Q.

A clamp base 10 is located over the disc carrying surface 3a in the disc system 50 and movable in either direction of the arrow P or Q. A clamper 11 for clamping the disc 4 is provided in the back of the clamp base 10.

The operations of the disc system 50 will be described below.

The disc system 50 is in the state of FIG. 2 when the power is off. That is, the clamp base 10 and the centering members 8a to 8d are at standby positions where they are on the periphery of the opening 52 and not exposed to the outside, and the open/close member 9 is at a position where it covers the aperture 3b.

In operating the disc system 50, the power is turned on by manipulating the control portion 51 in the state of FIG. 2. Then, the disc 4 is placed on the disc carrying surface 3a and the rib 3c. Subsequently, e.g., a reproduction button of the control portion 51 is actuated, and the clamp base 10 starts moving in the direction of the arrow Q. At the same time, the centering members 8a to 8d turn around the axes 8e and hold the edge of the disc 4. The disc 4 is moved to a centering position while being held by the centering members 8a to 8d.

After the clamp base 10 has been moved to a position overlapping the center of the disc 4, the open/close member 9 starts moving in the direction of the arrow Q. The open/close member 9 is moved to a standby position, as shown in FIG. 1. In the state of FIG. 1, the clamp base 10 is positioned to cover the aperture 3b (see FIG. 2), and the open/close member 9 is positioned to uncover the aperture 3b.

Next, a traverse base 5 (which will be described later) located at the back of the front cover 3 is moved in a direction that is in front of the front cover 3, and the turntable 1 and the optical pickup 2 mounted on the traverse base 5 are moved to positions accessible to the disc 4 through the aperture 3b. Thus, the disc 4 can be clamped with the turntable 1 and the clamper 11. After the disc 4 has been clamped, the centering members 8a to 8d turn around the axes 8e so as to be separated from the edge of the disc 4, as shown in FIG. 1.

Next, the turntable 1 rotates the disc 4, and the information layer of the disc 4 is irradiated with a light beam using the optical pickup 2, thereby reproducing the information signals recorded on the disc 4.

Although the reproduction operation of the disc 4 has been described above, the recording operation for recording the information signals on the disc 4 also can be performed in the same manner. In the above description, the reproduction button is actuated after the power is on. However, it is also possible to actuate only the reproduction button with the power remaining off, so that the power of the disc system 50 is turned on, and the disc 4 is shifted in the reproducing state.

When the disc 4 is taken out of the disc system 50, an ejection button of the control portion 51 is actuated in the state of FIG. 1, and thus the irradiation of the light beam from the optical pickup 2 is stopped, followed by the rotation of the turntable 1. Then, the centering members 8a to 8d hold the edge of the disc 4, and the traverse base 5 is moved back to a standby position (that is farther from the front in the direction passing through the center of the disc 4), so that the disc 4 clamped with the clamper 11 and the turntable 1 is released. Subsequently, as shown in FIG. 2, while the clamp base 10 and the open/close member 9 are moved in the direction of the arrow P, each of the centering members 8a to 8b is moved to a position separated from the disc 4. Thus, the disc 4 rests on the disc carrying surface 3a and the rib 3c, and the user can remove the disc 4 that is resting on the disc carrying surface 3a and the rib 3c.

A specific configuration of the disc device of Embodiment 1 will be described below.

Figure 3:
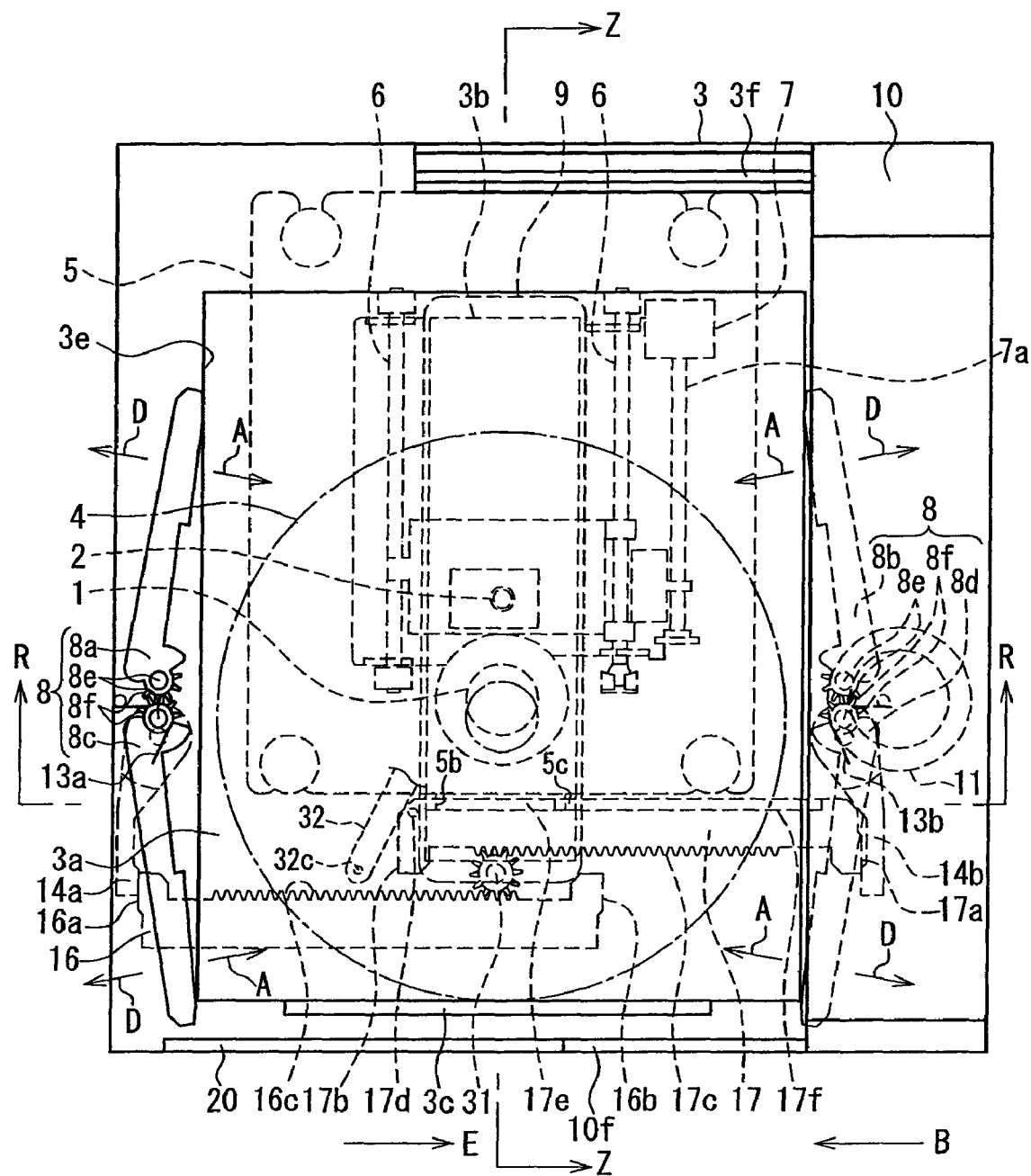
FIG. 3 is a plan view showing a disc loadable state of a disc device in Embodiment 1.
Figure 4:
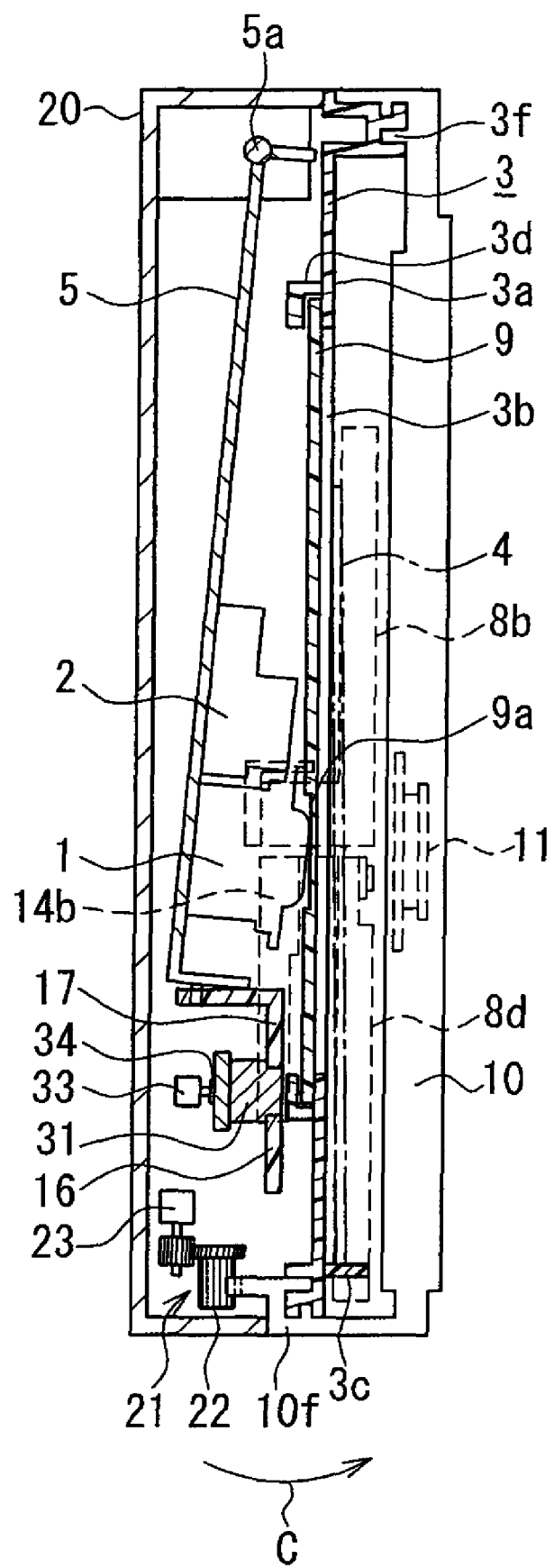
FIG. 4 is a cross-sectional side view showing the disc loadable state of the disc device in Embodiment 1.
Figure 5:
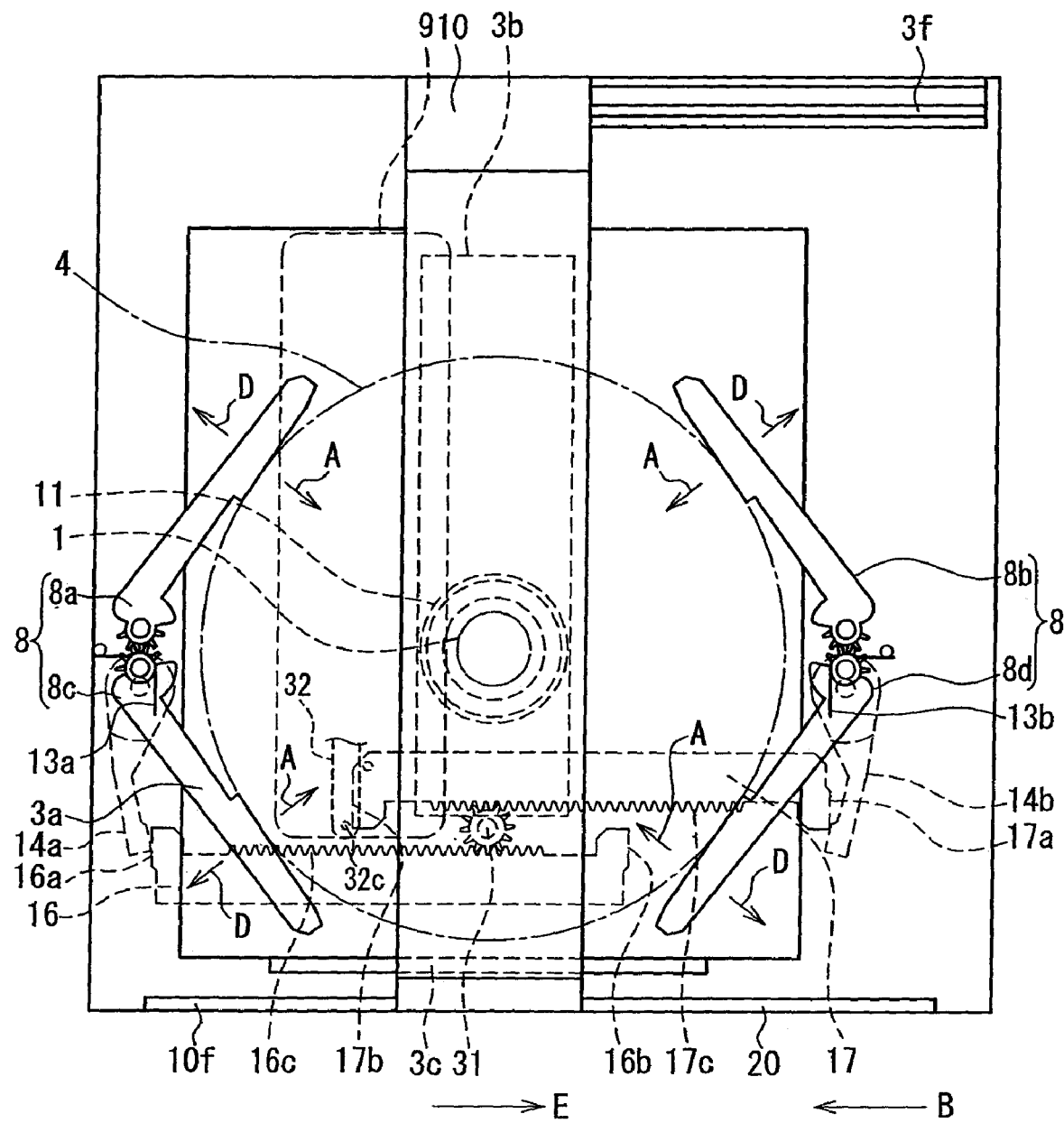
FIG. 5 is a plan view showing a state in which a disc centering operation of the disc device in Embodiment 1 has been finished.
Figure 6:
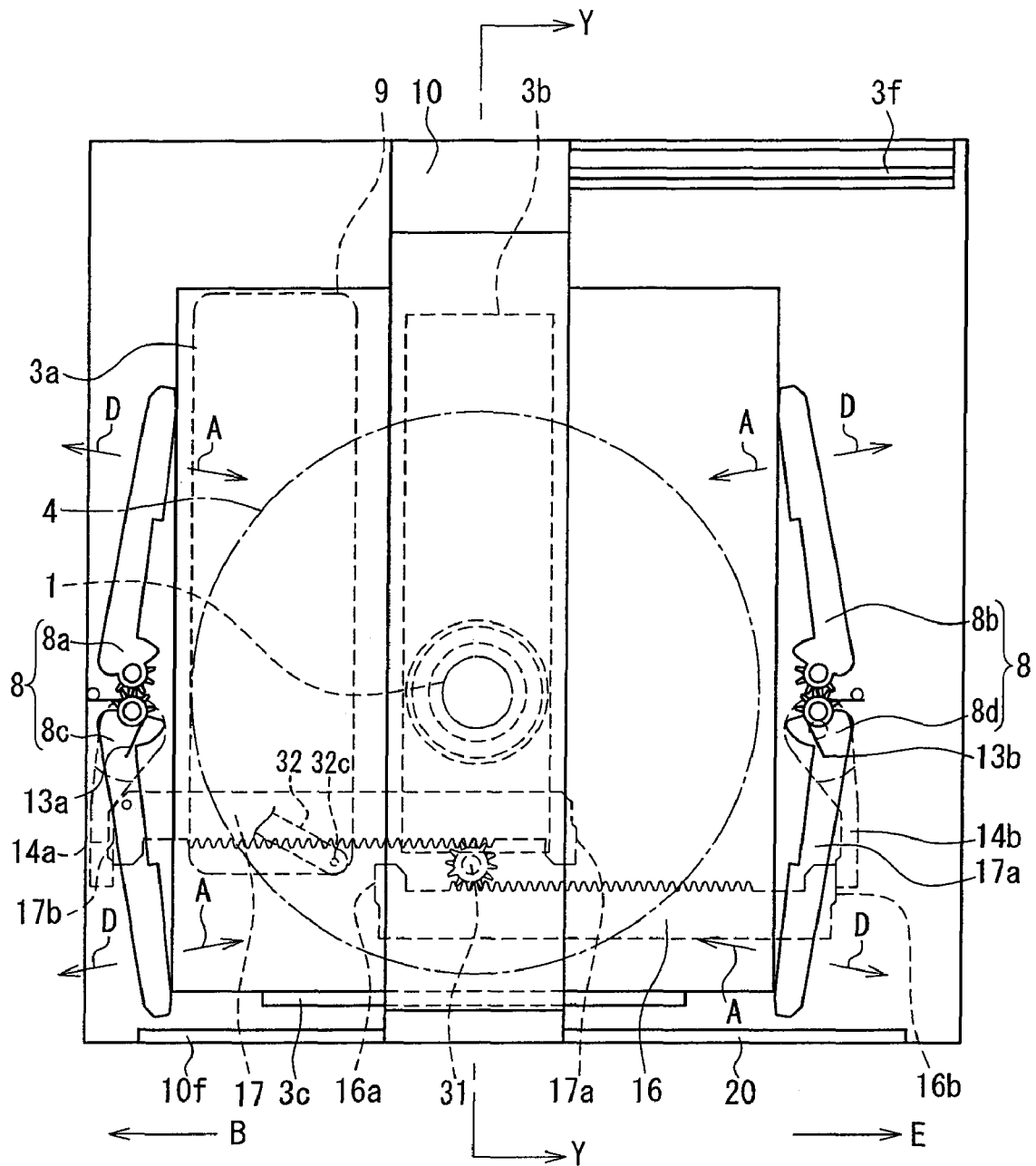
FIG. 6 is a plan view showing a disc recordable/reproducible state of the disc device in Embodiment 1.
Figure 7:
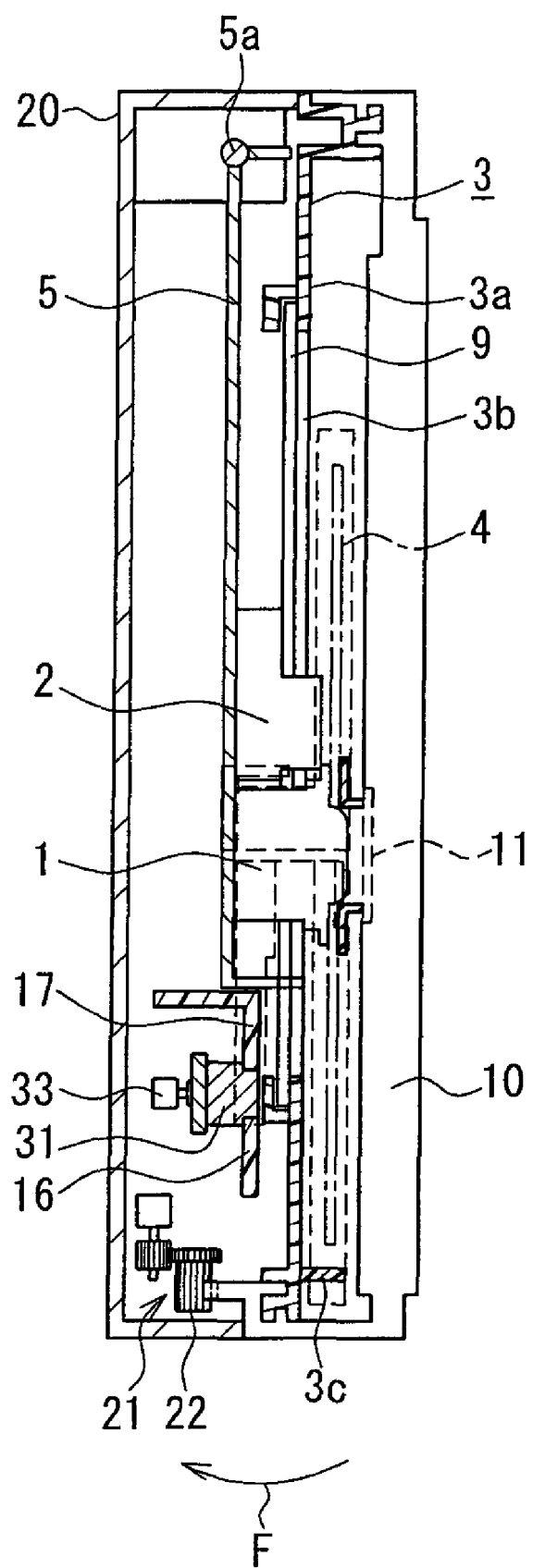
FIG. 7 is a cross-sectional side view showing the disc recordable/reproducible state of the disc device in Embodiment 1.
Figure 8:
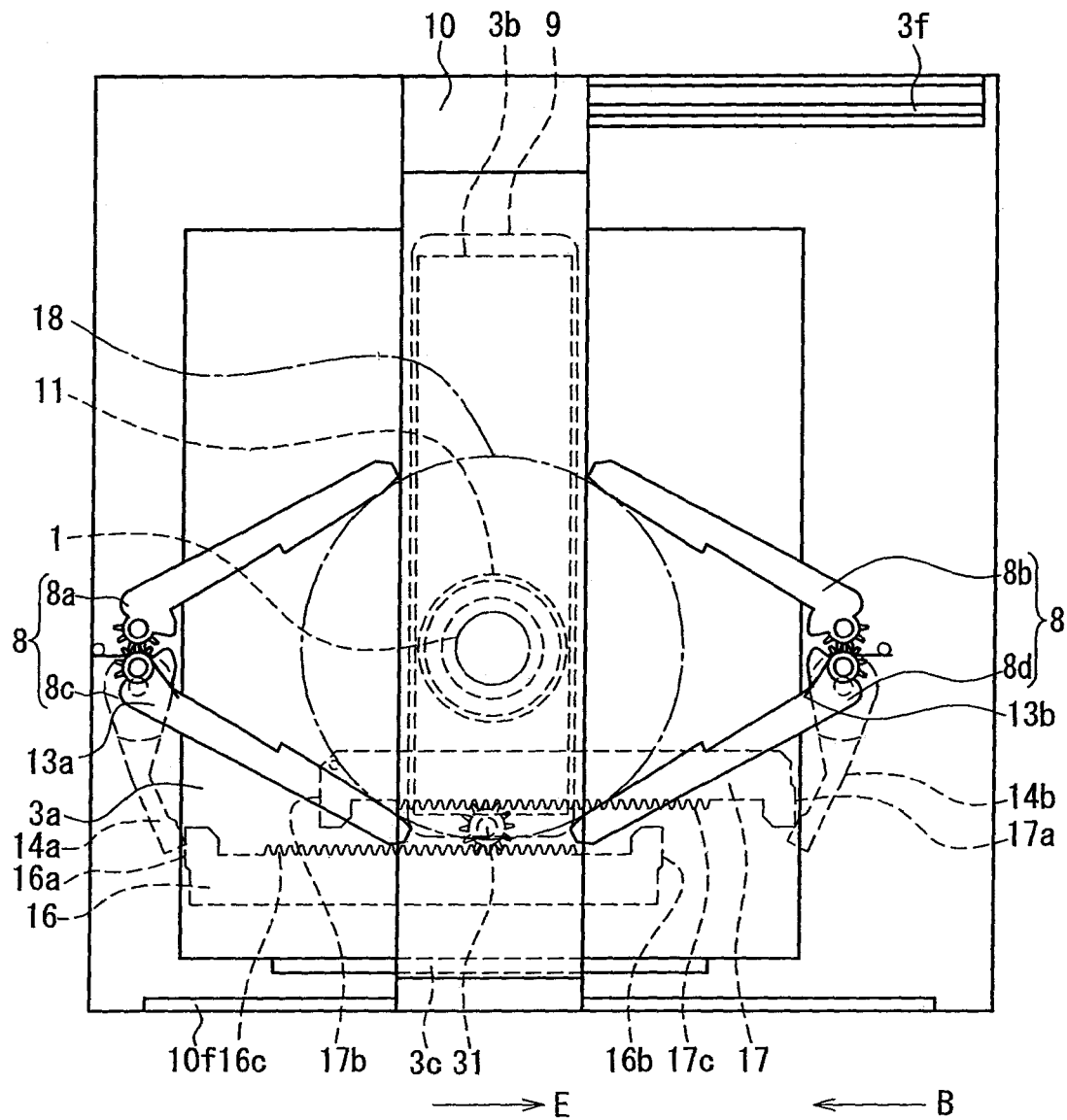
FIG. 8 is a plan view showing a state in which a small-diameter disc centering operation of the disc device in Embodiment 1 has been finished.

FIG. 3 is a plan view showing a disc loadable state (first position) of the disc device in Embodiment 1 of the present invention. In the "disc loadable state", the user can insert/ remove the disc 4 into/from the device. FIG. 4 is a cross-sectional side view of the disc loadable state of the disc device, taken along the line Z-Z in FIG. 3. FIGS. 5 and 8 are plan views showing a state in which a disc centering operation of the disc device has been finished (third position). FIG. 6 is a cross-sectional view showing a disc recordable/reproducible state (second position) of the disc device. FIG. 7 is a cross-sectional side view of the disc recordable/reproducible state of the disc device, taken along the line Y-Y in FIG. 6. FIGS. 3 to 7 show a configuration for inserting/removing a large-diameter disc (e.g., a disc with a diameter of 12 cm). The same components as those in FIGS. 1 and 2 are denoted by the same reference numerals and described in more detail.

In the drawings, the turntable 1 holds and rotates the disc 4 during recording or reproduction. The optical pickup 2 is used to record/reproduce the information signals with respect to the disc 4. The optical pickup 2 is located opposite to the recording surface of the disc 4 and can be moved in the radial direction of the disc 4. The turntable 1 and the optical pickup 2 are mounted on the traverse base 5.

The front cover 3 covers the front of the disc device and includes the disc carrying surface 3a, the aperture 3b, the rib 3c, and a wall portion 3e. The disc carrying surface 3a is located perpendicular to the direction of the optical axis of the optical pickup 2. The aperture 3b is formed in a part of the disc carrying surface 3a and allows a disc holding surface of the turntable 1 to pass through at the time of switching between the disc loadable state and the recordable/reproducible state.

The rib 3c is formed on the disc carrying surface 3a of the front cover 3 and spaced away from the turntable 1 and the optical pickup 2. The user can put the disc 4 on the rib 3c. The amount of protrusion of the rib 3c in the direction substantially perpendicular to the disc carrying surface 3a is designed with dimensions sufficient to support at least the disc 4 and a cartridge 19 (which will be described later) when the disc device is placed in a vertical position (i.e., placed in such a way that the disc carrying surface 3a is substantially perpendicular to the surface on which the device stands). Moreover, the rib 3c is positioned so that the center of the disc 4 contained in the cartridge 19 is aligned with the center of the turntable 1 in the recordable/reproducible state.

The wall portion 3e is formed around the disc carrying surface 3a, as shown in FIG. 3. When the disc 4 is placed on the disc carrying surface 3a, the wall portion 3e controls the position of the disc 4 in a lateral direction.

The guide groove 3f is formed in the upper end of the front cover 3, and the upper end of the clamp base 10 is slidably supported by the guide groove 3f.

A chassis 20 is fixed to the front cover 3 and covers the back that is on the other side of the disc carrying surface 3a.

The turntable 1 and the optical pickup 2 are mounted on the traverse base 5. The traverse base 5 can rotate about a shaft 5a between a standby position in the disc loadable state and a recording/reproducing position. The "standby position" is where the disc holding surface of the turntable 1 and the optical pickup 2 do not protrude from the disc carrying surface 3a of the front cover 3 (i.e., they are positioned lower than the disc carrying surface 3a). The "recording/reproducing position" is where the disc holding surface of the turntable 1 protrudes from the disc carrying surface 3a of the front cover 3, and the disc 4 is placed on the disc holding surface of the turntable 1 for recording or reproduction. The rotational mechanism of the traverse base 5 will be described later.

The optical pickup 2 is movably supported by guide shafts 6. A drive motor 7 has a shaft 7a that can output a rotational driving force. The optical pickup 2 is threadably mounted on the shaft 7a, and the rotation of the shaft 7a can move the optical pickup 2 in the radial direction of the disc 4 while being supported by the guide shafts 6.

A centering component 8 is used to shift the disc 4 so that the center of the disc 4 placed on the rib 3 is aligned with the center of the turntable 1. The centering component 8 includes four centering members 8a to 8d that are arranged symmetrically with respect to the turntable 1 in both vertical and horizontal directions. Each of the centering members 8a to 8d can turn around the axis 8e.

The centering members 8a to 8d come into contact with the disc 4 so that they are symmetrical about a first plane containing the rotation axis of the turntable 1 and the optical axis of the optical pickup 2 and a second plane crossing substantially at right angles to the first plane. In centering the disc 4, the first and second centering members 8a, 8b support the upper portion of the disc 4, and the third and fourth centering members 8c, 8d support the lower portion of the disc 4. Although the centering members 8a to 8d of this embodiment support the outer edge of the disc 4, portions other than the outer edge may be supported to shift the disc 4. The centering members 8a to 8d can turn in either direction of the arrow A or D and change their positions between a first position (FIG. 3) where the disc 4 or the cartridge 19 is placed on the disc carrying surface 3a while the centering members are withdrawn, a third position (FIG. 5) where the disc 4 supported by the centering members has been moved to the centering position, and a second position (FIG. 6) where the disc 4 is clamped after centering and brought into the recordable/reproducible state. In this embodiment, the centering members 8a to 8d may change their positions in the following order: the first position, the third position, and the second position for loading of the disc; and the second position, the third position, and the first position for removal of the disc.

A gear 8f is attached to the end of the individual centering members 8a to 8d. The gears 8f of the centering members 8a, 8c engage with each other, and the gears 8f of the centering members 8b, 8d engage with each other. Therefore, the centering member 8a turns at the same timing as the centering member 8c, and the centering member 8b turns at the same timing as the centering member 8d. Moreover, the mechanism inside the disc device is configured to allow the centering members 8a to 8d to turn at the same timing.

Each of the centering members 8a to 8d has a length long enough to lift a large- or small-diameter disc placed on the disc carrying surface 3a and the rib 3c of the front cover 3 by turning.

The cartridge 19 is a disc contained in a case corresponding to, e.g., a generally distributed DVD-RAM cartridge, but not limited thereto. The disc cartridge 19 has a shutter 19b that can open to expose a part of the internal disc 4 and close to protect the disc 4. Therefore, the shutter 19b opens during recording or reproduction of the information signals with respect to the disc 4 and closes when the cartridge 19 is unloaded from the disc device so that the disc 4 is protected from dust or the like.

The clamp base 10 is on standby at a position outside the wall portion 3e where the clamp base 10 does not overlap the disc carrying surface 3a. Thus, the disc 4 does not touch the clamp base 10 when it is placed on the disc carrying surface 3a of the front cover 3. In this embodiment, the clamp base 10 is on standby at the right position of the disc carrying surface 3a, as shown in FIG. 3. However, the clamp base 10 may be on standby at the left position of the disc carrying surface 3a. Moreover, the clamp base 10 can be moved from the standby position to a clamp position in a direction perpendicular to the direction of movement of the optical pickup 2 and parallel to the disc holding surface of the turntable 1. The "clamp position" is where the clamp base 10 has been moved directly above the disc holding surface of the turntable 1 and can perform clamping with the turntable 1. The clamp base 10 is moved by a transfer mechanism 21. The clamp base 10 is configured not to touch the disc 4 placed on the disc carrying surface 3a at the clamp position and during the movement between the clamp position and the standby position.

As shown in FIG. 4, the transfer mechanism 21 includes a motor 23 and a gear 22 that is engaged with a rack 10f integrated with the clamp base 10. The transfer mechanism 21 transfers a driving force from the motor 23 to the gear 22, thereby moving the clamp base 10.

The clamper 11 is provided in the surface of the clamp base 10 opposed to the front cover 3 and can clamp the disc 4 to the disc holding surface of the turntable 1. In the clamp base 10, the clamper 11 can move slightly in the direction of the rotation axis of the turntable 1. Moreover, the clamper 11 contains a magnetic body and is attracted to the turntable 1, containing an oppositely polarized magnetic body (e.g., an iron plate), by the magnetic force between the two magnetic bodies.

Springs 13a, 13b bias the centering members 8c, 8d in a centering direction indicated by the arrow A. In this embodiment, the springs 13a, 13b are coil springs, but can be other elastic members such as leaf springs as long as the centering members 8c, 8d are biased in the centering direction. Moreover, the springs 13a, 13b are arranged so that the coil portions are substantially coaxial with the rotation centers of the centering members 8c, 8d, respectively. However, the springs 13a, 13b may be arranged in the rotation centers of the centering members 8a, 8b. Alternatively, the springs also may be arranged in each of the rotation centers of the centering members 8a to 8d. The spring rate of the springs 13a, 13b is set so that a load applied from the spring 13a to the centering member 8c is the same as that applied from the spring 13b to the centering member 8d. Therefore, the disc 4 can be centered precisely. One end of each of the springs 13a, 13b is supported by a part of the front cover 3, and the other end is supported by a part of the corresponding centering members 8c, 8d.

Centering adjustment members 14a, 14b are rotatably supported by the axes arranged coaxially with or in the vicinity of the centering members 8c, 8d. Each of the centering adjustment members 14a, 14b has a gear at one end. The gear of the centering adjustment member 14a is engaged with the gear 8f of the centering member 8a, and the gear of the centering adjustment member 14b is engaged with the gear 8f of the centering member 8b. The centering adjustment members 14a, 14b are engaged with the centering members 8c, 8d, which are biased in the direction of the arrow A by the springs 13a, 13b, via the centering members 8a, 8b and thus biased in the direction of the arrow A. Moreover, the other ends of the centering adjustment members 14a, 14b come into contact with racks 16, 17 (which will be described later), thereby controlling the rotation of the centering adjustment members 14a, 14b in the direction of the arrow A. This controls not only the rotation of the centering members 8a, 8b, but also the rotation of the centering members 8c, 8d engaged with the centering members 8a, 8b. Accordingly, the rotation of the centering members 8a to 8d can be controlled by controlling the rotation of the centering adjustment members 14a, 14b.

As shown in FIG. 4, the centering adjustment members 14a, 14b are located at the back of the disc carrying surface 3a of the front cover 3. Therefore, the gears 8f of the centering members 8a, 8b reach the back of the front cover 3 because of their engagement with the gears of the centering adjustment members 14a, 14b in FIG. 3. The gears of the centering adjustment members 14a, 14b have a larger pitch circle diameter (PCD) than the gears 8f. When the centering adjustment members 14a, 14b rotate, therefore, the amount of rotation of the centering members 8a to 8d can be larger than that of the centering adjustment members 14a, 14b. In this embodiment, the pitch circle diameter of the gears of the centering adjustment members 14a, 14b is about two times as large as that of the gears 8f. Thus, the rotation angle (i.e., the amount of rotation) of the centering adjustment members 14a, 14b is half that of the centering members 8a to 8d, and the amount of movement of the racks 16, 17 also is reduced by half.

The first rack 16 and the second rack 17 can be moved substantially perpendicular to a line containing the center of the turntable 1 and the center of the optical pickup 2 and in opposite directions with respect to the line at the same velocity. When the disc device is in the disc loadable state, as shown in FIG. 3, the first rack 16 is positioned near to the centering member 8c with its left end 16a in contact with the centering adjustment member 14a, thereby controlling the rotation of the centering adjustment member 14a in the direction of the arrow A; and the second rack 17 is positioned near to the centering member 8d with its right end 17a in contact with the centering adjustment member 14b, thereby controlling the rotation of the centering adjustment member 14b in the direction of the arrow A. The first rack 16 can be moved in the direction of the arrow E and the second rack 17 can be moved in the direction of the arrow B with a driving force supplied from a driving source such as a motor, which is provided separately. The driving mechanism of the first and second racks 16, 17 will be described later.

The first and second racks 16, 17 start to move simultaneously, so that the centering accuracy of the disc 4 can be improved. Moreover, when the first and second racks 16, 17 start to move at the same time and continue to move at the same velocity, the centering accuracy of the disc 4 can be improved further.

The driving force from the driving source may be transferred independently to the racks 16, 17. In this embodiment, teeth 16c, 17c are formed on the sides of the racks 16, 17 that face each other, and a gear 31 is engaged with both the teeth 16c, 17c. The driving force is transferred from the driving source to the gear 31 and then to the teeth 16c, 17c engaged with the gear 31, causing the racks 16, 17 to move in opposite directions of the arrows B, E.

Each of the racks 16, 17 comes into contact as much as possible with the same portion of the centering adjustment members 14a, 14b so that the centering members 8a, 8c turn at the same timing as the centering members 8b, 8d.

The racks 16, 17 are arranged in such a manner that they are not in contact with each other when the disc device is viewed from the front (FIG. 3) and are aligned vertically when the disc device is viewed from the side (FIG. 4).

Although a holding function of the racks 16, 17 is not shown, the racks 16, 17 may be held slidably, e.g., by forming a cam groove along the longitudinal direction of each of the racks 16, 17 and providing a pin engaged with the cam groove on the device. Any other configuration also can be used.

The operations of the disc device having the above configuration will be described below.

Insertion/Removal Operation of a Large-Diameter Disc

In FIG. 3, when a user puts the disc 4 on the disc carrying surface 3a and the rib 3c, the center of the disc 4 is displaced downward from the center of the turntable 1. The position of the disc 4 in the lateral direction is controlled by the wall portion 3e. In addition, the positioning control of the disc 4 is performed to some extent by bringing the disc 4 into contact with the centering members 8a to 8d. At this time, the centering members 8a to 8d are withdrawn so that they are not positioned on a projection plane of the disc carrying surface 3a. The centering adjustment members 14a, 14b are at the positions shown in FIG. 3. The left end 16a of the first rack 16 is in contact with the centering adjustment member 14a and the right end 17a of the second rack 17 is in contact with the centering adjustment member 14b, thereby controlling the rotation of the centering adjustment members 14a, 14b and the centering members 8a to 8d in the direction of the arrow A.

Next, a switch (not shown) is actuated to start the recording or reproduction operation. Then, the clamp base 10 is moved from the standby position shown in FIG. 3 in the direction of the arrow B, which is perpendicular to the direction of movement of the optical pickup 2, to the clamp position shown in FIG. 5.

Next, as shown in FIG. 4, a rotational driving force is transferred from the motor 33 to the gear 31 via the motor gear 34, and further transferred to the first and second racks 16, 17 engaged with the gear 31. Thus, the first rack 16 starts moving from the position shown in FIG. 3 in the direction of the arrow E, and the second rack 17 starts moving from the position shown in FIG. 3 in the direction of the arrow B. Then, the centering adjustment members 14a, 14b rotate in the direction of the arrow A while being in contact with the first and second racks 16, 17 by the biasing forces of the springs 13a, 13b, respectively. This causes the centering members 8a, 8b engaged with the centering adjustment members 14a, 14b to turn around the axes 8e in the direction of the arrow A and also causes the centering members 8c, 8d engaged with the centering members 8a, 8b to turn around the axes 8e in the direction of the arrow A.

As the second rack 17 is moved in the direction of the arrow B, a pin 17d fixed to the second rack 17 presses a lever 32 in the direction of the arrow B, and the lever 32 pivots about a pivotal axis 32c in a counterclockwise direction. Since the lever 32 is connected to the open/close member 9, the pivoting of the lever 32 moves the open/close member 9 in the direction of the arrow B. The relationship between the lever 32 and the open/close member 9 and a detailed movement of the open/close member 9 will be described later.

The centering members 8a to 8d turning with the movements of the first and second racks 16, 17 come into contact with the outer circumference of the disc 4. When the centering members 8a to 8d turn further, as shown in FIG. 5, the edge of the disc 4 slides in each of the contact portions with the centering members 8a to 8d, and the disc 4 can be shifted toward the center of the turntable 1.

In this embodiment, during turning of the centering members 8a to 8d, the lower centering members 8c, 8d first come into contact with the outer circumference of the disc 4 and continue to turn while holding the edge of the disc 4, so that the disc 4 can be lifted to the center of the turntable 1. Then, the upper centering members 8a, 8b come into contact with the outer circumference of the disc 4, and finally the edge of the disc 4 can be supported at four points.

As shown in FIG. 5, when the disc 4 reaches a position (third position) where the centering operation is finished, the first to fourth centering members 8a to 8d stop turning and hold the disc 4 by being pressed against the edge of the disc 4 due to the biasing forces of the springs 13a, 13b. At this time, the centering members 8a to 8d are standing still because they maintain a balance in pressing force to support the edge of the disc 4. In FIG. 5, the open/close member 9 is moved along with the movement of the second rack 17, and a part of the aperture 3b is opened. However, the open/close member 9 is moved to a position where it uncovers the aperture 3b completely by further movements of the racks 16, 17.

The racks 16, 17 continue to move in the respective directions of the arrows E, B, even after the centering members 8a to 8d support the edge of the disc 4. Since the centering members 8a, 8c are in contact with the edge of the disc 4, the rotation of the centering members 8a, 8c is controlled, and thus the rotation of the centering adjustment member 14a also is controlled. Therefore, as the rack 16 is moved in the direction of the arrow E, the centering adjustment member 14a becomes separated from the rack 16. Similarly, since the centering members 8b, 8d are in contact with the edge of the disc 4, the rotation of the centering members 8b, 8d is controlled, and thus the rotation of the centering adjustment member 14b also is controlled. Therefore, as the rack 17 is moved in the direction of the arrow B, the centering adjustment member 14b becomes separated from the rack 17.

Next, the traverse base 5 rotates about the shaft 5a in the direction of the arrow C in FIG. 4, and the turntable 1 is moved to the recording/reproducing position through the aperture 3b. A detailed rotational movement of the traverse base 5 will be described later.

As a result, the disc 4 is placed on the disc holding surface of the turntable 1 and lifted. When the turntable 1 is moved closer to the clamp position of the disc 4, the clamper 11 is attracted to the disc holding surface of the turntable 1 by a magnetic force, and the disc 4 is clamped with the turntable 1 and the clamper 11. At this time, the racks 16, 17 continue to move in the respective directions of the arrows E, B.

After the disc 4 has been clamped, the first and second racks 16, 17 continue to move, so that the right end 16b of the first rack 16 comes into contact with the centering adjustment member 14b, and the left end 17b of the second rack 17 comes into contact with the centering adjustment member 14a.

When the first and second racks 16, 17 are moved further in the respective directions of the arrows E, B, the first rack 16 presses the centering adjustment member 14b to start rotating in the direction of the arrow D, and the second rack 17 presses the centering adjustment member 14a to start rotating in the direction of the arrow D.

Accordingly, the rotational force of the centering adjustment member 14a is transferred to the centering members 8a, 8c via the gears, and the rotational force of the centering adjustment member 14b is transferred to the centering members 8b, 8d via the gears. Thus, as shown in FIG. 6, each of the centering members 8a to 8d turns in the direction of the arrow D and is withdrawn to a position separated from the outer circumference of the disc 4. At this time, the disc 4 is clamped with the clamper 11 and the turntable 1, as shown in FIG. 7.

Next, the disc 4 is rotated by rotating the turntable 1, and the information signals can be recorded/reproduced with respect to the disc 4 using the optical pickup 2.

After being separated from the disc 4, the first to fourth centering members 8a to 8d may be withdrawn to any positions between the second position and the third position as long as they are separated from the outer circumference of the disc 4 held by the turntable 1.

The above disc loading operation is performed by moving the clamp base 10, centering the disc 4, and moving the traverse base 5 (for clamping) in the indicated order. However, the disc loading operation does not necessarily need to be performed in this order, and may be performed in a different order as long as the disc 4 can be shifted to the clamping state.

Next, the operation of removing the disc 4 from the disc device will be described.

When an ejection switch (not shown) is actuated while the disc 4 is at the recording/reproducing position, as shown in FIG. 6, the rotation of the turntable 1 is stopped, followed by the rotation of the disc 4. Then, a driving force output from the motor 33 (see FIG. 4) is transferred to the racks 16, 17.

The first rack 16 starts moving from the position shown in FIG. 6 in the direction of the arrow B. The second rack 17 starts moving from the position shown in FIG. 6 in the direction of the arrow E. With these movements, the centering adjustment member 14a rotates in the direction of the arrow A while being in contact with the rack 17 by the biasing force of the spring 13a, and the centering adjustment member 14b rotates in the direction of the arrow A while being in contact with the rack 16 by the biasing force of the spring 13b. Moreover, the centering members 8a to 8d engaged with the centering adjustment members 14a, 14b via the gears turn around the axes 8e in the direction of the arrow A.

Accordingly, the centering members 8a to 8d are moved from the second position (where each of the centering members 8a to 8d is separated from the disc 4) to the third position to support the edge of the disc 4, as shown in FIG. 5. Thus, the disc 4 is supported by pressing the centering members 8a to 8d against the edge of the disc 4 due to the biasing forces of the springs 13a, 13b. The racks 16, 17 continue to move in the respective directions of the arrows B, E, even after the centering members 8a to 8d support the edge of the disc 4. When the racks 16, 17 are moved to their predetermined positions, the right end 16b of the first rack 16 is separated from the centering adjustment member 14b, and the left end 17b of the second rack 17 is separated from the centering adjustment member 14a.

Next, as shown in FIG. 7, the traverse base 5 rotates about the shaft 5a in the direction of the arrow F, so that the recordable/reproducible state is shifted to the standby state of FIG. 4. Therefore, the turntable 1 is detached from the clamper 11 against the magnetic attraction force, and thus the disc 4 that has been clamed is now supported only by the centering members 8a to 8d, as shown in FIG. 5.

When the first and second racks 16, 17 are moved further in the respective directions of the arrows B, E, the left end 16a of the first rack 16 comes into contact with the centering adjustment member 14a, and the right end 17a of the second rack 17 comes into contact with the centering adjustment member 14b, as shown in FIG. 3. Thereafter, the first rack 16 is moved further in the direction of the arrow B, and the centering adjustment member 14a that is being pressed by the first rack 16 rotates against the biasing force of the spring 13a. Then, the centering members 8a, 8c engaged with the centering adjustment member 14a turn in the direction of the arrow D against the biasing forces of the springs 13a, 13b. While the centering members turn in the direction of the arrow D, the disc 4 slides down the contact surfaces of the disc 4 with each of the centering members 8c, 8d and rests on the rib 3c. The motor 33 is stopped at the time the first and second racks 16, 17 reach the first position shown in FIG. 3, and subsequently the rotation of the motor gear 34 and the gear 31 is stopped, followed by the movements of the first and second racks 16, 17.

Next, the clamp base 10 is moved from the clamp position shown in FIG. 5 in the direction of the arrow E to the standby position shown in FIG. 3 by a driving mechanism such as a motor. In this state, the user can remove the disc 4 from the disc device.

With the movement of the rack 17 in the direction of the arrow E, the open/close member 9 is moved to a position where it covers the aperture 3b, as shown in FIG. 3.

The above disc removal operation is performed by releasing the clamping state, releasing the centering of the disc 4, and withdrawing the clamp base 10 in the indicated order. However, the disc removal operation does not necessarily need to be performed in this order, and may be performed in a different order as long as the disc 4 can be shifted from the clamping state to a state in which the disc 4 can be removed.

Insertion/Removal Operation of a Small-Diameter Disc 18

The disc device of this embodiment also can be loaded with a small-diameter disc 18, as shown in FIG. 8. FIG. 8 is a plan view showing a state in which the small-diameter disc 18 (e.g., a disc with a diameter of 8 cm) is loaded in the disc device.

The small-diameter disc 18 is substantially the same as the large-diameter disc 4 in the loading operation, but differs in the amount of rotation of the centering adjustment members 14a, 14b and the centering members 8a to 8d. Since the small-diameter disc 18 has a smaller diameter than the large-diameter disc 4, the centering members 8a to 8d and the centering adjustment members 14a, 14b are required to move by a large amount for centering the small-diameter disc 18.

To increase the amount of rotation of each member, it is necessary not only to broaden the range of formation of the gears 8f in the centering members 8a to 8d and the gears in the centering adjustment members 14a, 14b, but also to optimize the arrangement or spring rate of the springs 13a, 13b. Moreover, the length or arrangement of the centering members 8a to 8d should be optimized for holding the small-diameter disc placed on the rib 3c.

This embodiment optimizes the arrangement or spring rate of the springs 13a, 13b as well as the length or arrangement of the centering members 8a to 8d so that both the large-diameter disc 4 and the small-diameter disc 18 can be held.

The centering operation of the small-diameter disc 18 is the same as that of the large-diameter disc 4, and therefore a detailed explanation will not be repeated.

Insertion/Removal Operation of a Cartridge 19

Next, the insertion/removal operation of a cartridge 19 will be described by referring to FIGS. 9 and 10.

Figure 9:
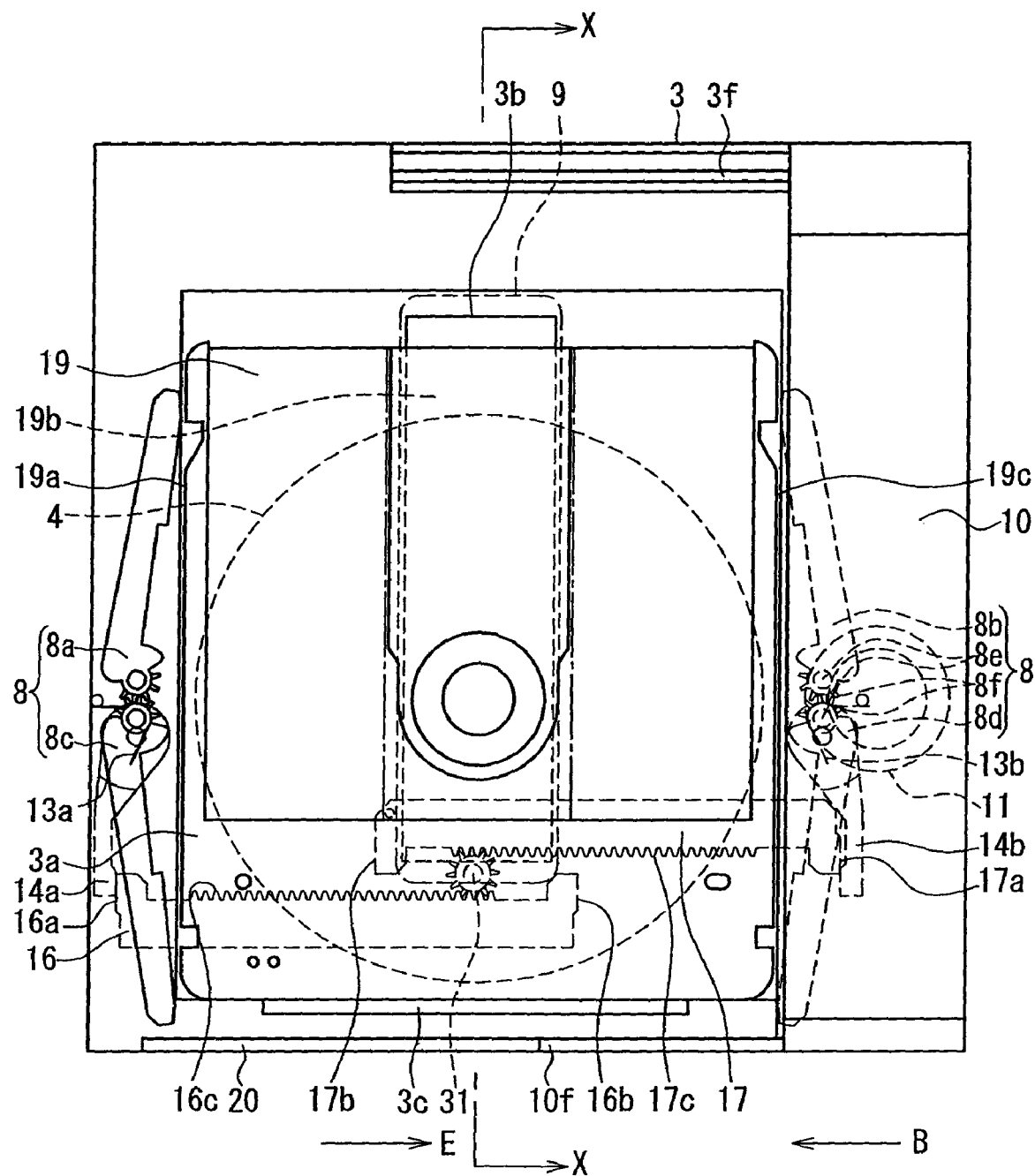
FIG. 9 is a plan view showing a state in which a case containing a disc is loaded in the disc device in Embodiment 1.

FIG. 9 is a plan view showing a state in which a disc contained in a case (referred to as "cartridge" in the following) is loaded in the disc device. FIG. 10 is a cross-sectional side view showing a state in which the cartridge is loaded in the disc device, taken along the line X-X in FIG. 9.

As shown in FIG. 9, while the first to fourth centering members 8a to 8d are at the first position, a user can put the cartridge 19 on the disc carrying surface 3a and the rib 3c. When the cartridge 19 is put on the disc carrying surface 3a and the rib 3c by the user, the position of the cartridge 19 in the lateral direction is controlled by the centering members 8a to 8d that are located on the left and right sides of the disc carrying surface 3a in the plane direction.

At this case, the first and third centering members 8a, 8c are not in contact with the left edge 19a of the cartridge 19 and separated therefrom. Similarly, the second and fourth centering members 8b, 8d are not in contact with the right edge 19c of the cartridge 19 and separated therefrom. The centering adjustment members 14a, 14b are at the positions shown in FIG. 9.

The left end 16a of the first rack 16 is in contact with the centering adjustment member 14a and the right end 17a of the second rack 17 is in contact with the centering adjustment member 14b, thereby controlling the rotation of the centering adjustment members 14a, 14b and the centering members 8a to 8d in the direction of the arrow A.

Next, a switch (not shown) is actuated to start the recording or reproduction operation. Then, the clamp base 10 is moved from the standby position shown in FIG. 9 in the direction of the arrow B, which is perpendicular to the direction of movement of the optical pickup 2, by a driving mechanism such as a motor. The clamp base 10 is moved to a clamp position where the center of the turntable 1 is substantially aligned with the center of the clamper 11 (not shown).

Next, a rotational driving force is transferred from the motor 33 (see FIG. 4) to the racks 16, 17 via the motor gear 34 and the gear 31. Due to the transferred driving force, the rack 16 starts moving from the position shown in FIG. 9 in the direction of the arrow E, and the rack 17 starts moving from the position shown in FIG. 9 in the direction of the arrow B.

After the racks 16, 17 start moving, the centering adjustment members 14a, 14b rotate in the direction of the arrow A while being in contact with the racks 16, 17 by the biasing forces of the springs 13a, 13b, respectively. The rotation of the centering adjustment members 14a, 14b causes the centering members 8a to 8d engaged with the centering adjustment members 14a, 14b to turn around the axes 8e in the direction of the arrow A.

The centering members 8a to 8d continue to turn and come into contact with the left and right edges 19a, 19c of the cartridge 19. Then, the centering members 8a to 8d stops turning and are pressed against the left and right edges 19a, 19c of the cartridge 19 by the biasing forces of the springs 13a, 13b. Thus, the positioning of the cartridge 19 in the lateral direction is finished. In this case, the positioning of the cartridge 19 in the vertical direction has been achieved by placing the cartridge 19 on the rib 3c.

The racks 16, 17 continue to move in the respective directions of the arrows E, B, even after the centering members 8a to 8d come into contact with the left and right edges 19a, 19c of the cartridge 19. As the racks 16, 17 are moved, the centering adjustment member 14a becomes separated from the left end 16a of the first rack 16, and the centering adjustment member 14b becomes separated from the right end 17a of the second rack 17.

Subsequently, a shutter 19b of the cartridge 19 is opened by a shutter open/close mechanism (not shown).

Figure 10:
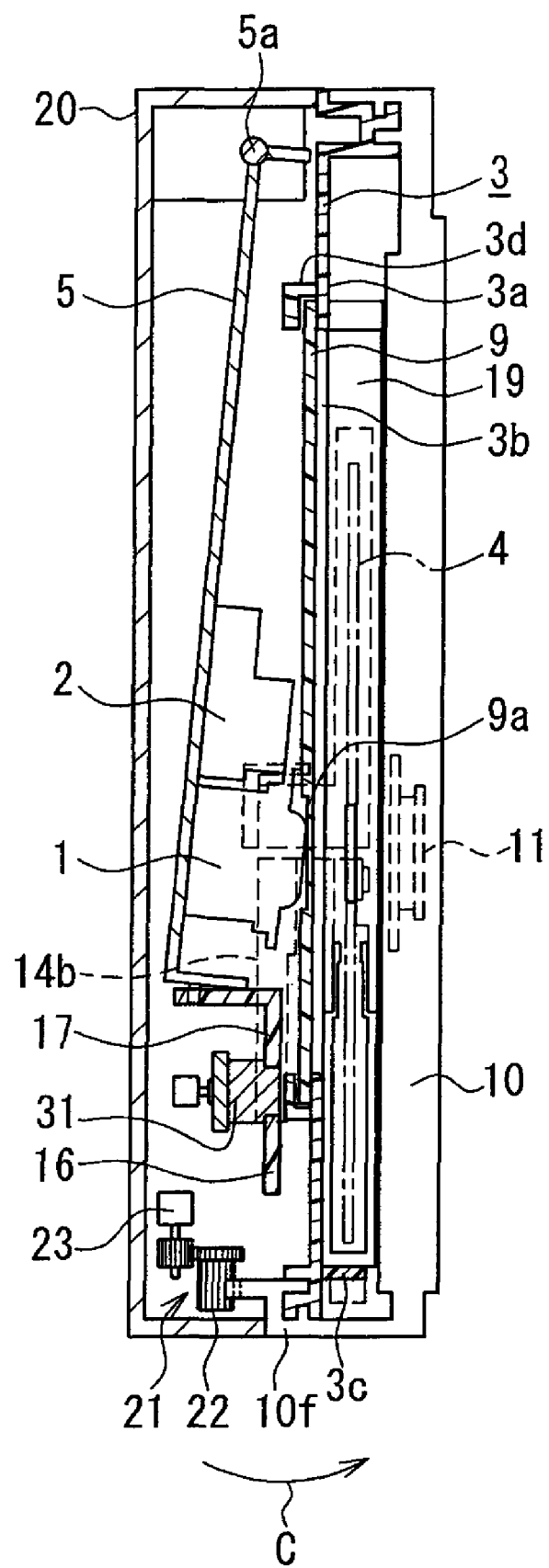
FIG. 10 is a cross-sectional side view showing a state in which a case containing a disc is loaded in the disc device in Embodiment 1.

Next, the traverse base 5 rotates about the shaft 5a in the direction of the arrow C in FIG. 10, and the turntable 1 is moved to the recording/reproducing position through the aperture 3b. As a result, the disc 4 in the cartridge 19 is placed on the disc holding surface of the turntable 1 and lifted.

When the disc 4 is lifted by the turntable 1, the clamper 11 located opposite to the turntable 1 is attracted to the disc holding surface of the turntable 1 by a magnetic force, and the disc 4 is clamped with the turntable 1 and the clamper 11. During clamping, the racks 16, 17 continue to move in the respective directions of the arrows E, B.

After the traverse base 5 has been moved to the recording/reproducing position, the right end 16b of the first rack 16 comes into contact with the centering adjustment member 14b, and the left end 17b of the second rack 17 comes into contact with the centering adjustment member 14a.

When the first and second racks 16, 17 are moved further in the respective directions of the arrows E, B, the first rack 16 presses the centering adjustment member 14b to rotate in the direction of the arrow D, and the second rack 17 presses the centering adjustment member 14a to rotate in the direction of the arrow D.

With the rotation of the centering adjustment members 14a, 14b, the rotational force of the centering adjustment member 14a is transferred to the centering members 8a, 8c via the gears, and the rotational force of the centering adjustment member 14b is transferred to the centering members 8b, 8d via the gears. Thus, each of the centering members 8a to 8d turns in the direction of the arrow D and is separated from the left and right edges 19a, 19c of the cartridge 19.

Next, the disc 4 is rotated by rotating the turntable 1, and the information signals can be recorded/reproduced with respect to the disc 4 using the optical pickup 2.

Next, the operation of removing the cartridge 19 from the disc device will be described.

When an ejection switch (not shown) is actuated while the disc 4 in the cartridge 19 is at the recording/reproducing position, the rotation of the turntable 1 is stopped, followed by the rotation of the disc 4.

Then, a driving force output from the motor 33 (see FIG. 4) is transferred to the racks 16, 17 via the motor gear 34 and the gear 31. Due to the transferred driving force, the first rack 16 in contact with the centering adjustment member 14b starts moving in the direction of the arrow B, and the second rack 17 in contact with the centering adjustment member 14a starts moving in the direction of the arrow E.

As the first and second racks 16, 17 are moved, the centering adjustment members 14a, 14b rotate in the direction of the arrow A while being in contact with the racks 17, 16 by the biasing forces of the springs 13a, 13b, respectively. Moreover, the centering members 8a to 8d engaged with the centering adjustment members 14a, 14b via the gears turn around the axes 8e in the direction of the arrow A.

Accordingly, the centering members 8a to 8d are moved from the second position (where each of the centering members 8a to 8d is separated from the cartridge 19) to the third position to support the sides of the cartridge 19. Thus, the cartridge 19 is supported by pressing the centering members 8a to 8d against the left and right edges 19a, 19c of the cartridge 19 due to the biasing forces of the springs 13a, 13b.

The racks 16, 17 continue to move in the respective directions of the arrows B, E, even after the centering members 8a to 8d come into contact with the left and right edges 19a, 19c of the cartridge 19. As the racks 16, 17 are moved, the right end 16b of the first rack 16 becomes separated from the centering adjustment member 14b, and the left end 17b of the second rack 17 becomes separated from the centering adjustment member 14a.

Next, the traverse base 5 rotates about the shaft 5a in the opposite direction to the arrow C and thus is moved back to the standby position shown in FIG. 10. Therefore, the disc 4 held by the turntable 1 and the clamper 11 is removed from the disc holding surface of the turntable 1. At this time, the racks 16, 17 continue to move in the respective directions of the arrows B, E.

When the first and second racks 16, 17 are moved further in the respective directions of the arrows B, E, the left end 16a of the first rack 16 comes into contact with the centering adjustment member 14a, and the right end 17a of the second rack 17 comes into contact with the centering adjustment member 14b. Thereafter, the first and second racks 16, 17 are moved further in the respective directions of the arrows B, E, and the centering adjustment members 14a, 14b rotate against the biasing forces of the springs 13a, 13b. Then, the centering members 8a to 8d engaged with the centering adjustment members 14a, 14b turn in the direction of the arrow D against the biasing forces of the springs 13a, 13b.

Next, the clamp base 10 is moved from the clamp position in the direction of the arrow E to the standby position shown in FIG. 9. The clamp base 10 does not overlap the cartridge 19 at the standby position, and therefore the user can remove the cartridge 19 from the disc device.

Transfer Operation of an Open/Close Member 9

Figure 11:
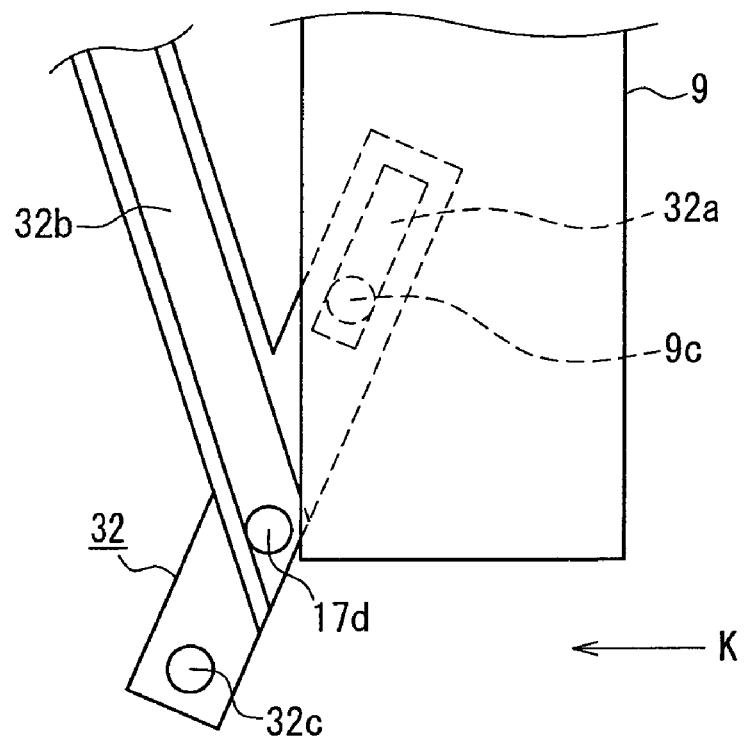
FIG. 11 is a plan view showing the main portion of a mechanism for moving an open/close member in Embodiment 1, where the open/close member is positioned to cover an aperture.
Figure 12:
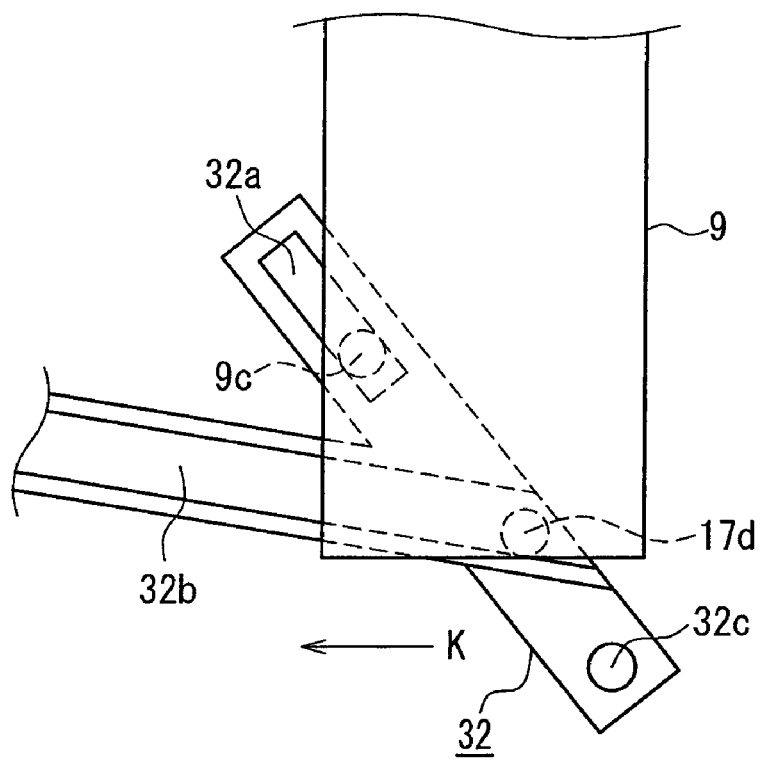
FIG. 12 is a plan view showing the main portion of a mechanism for moving an open/close member in Embodiment 1, where the open/close member is at a position during movement.
Figure 13:
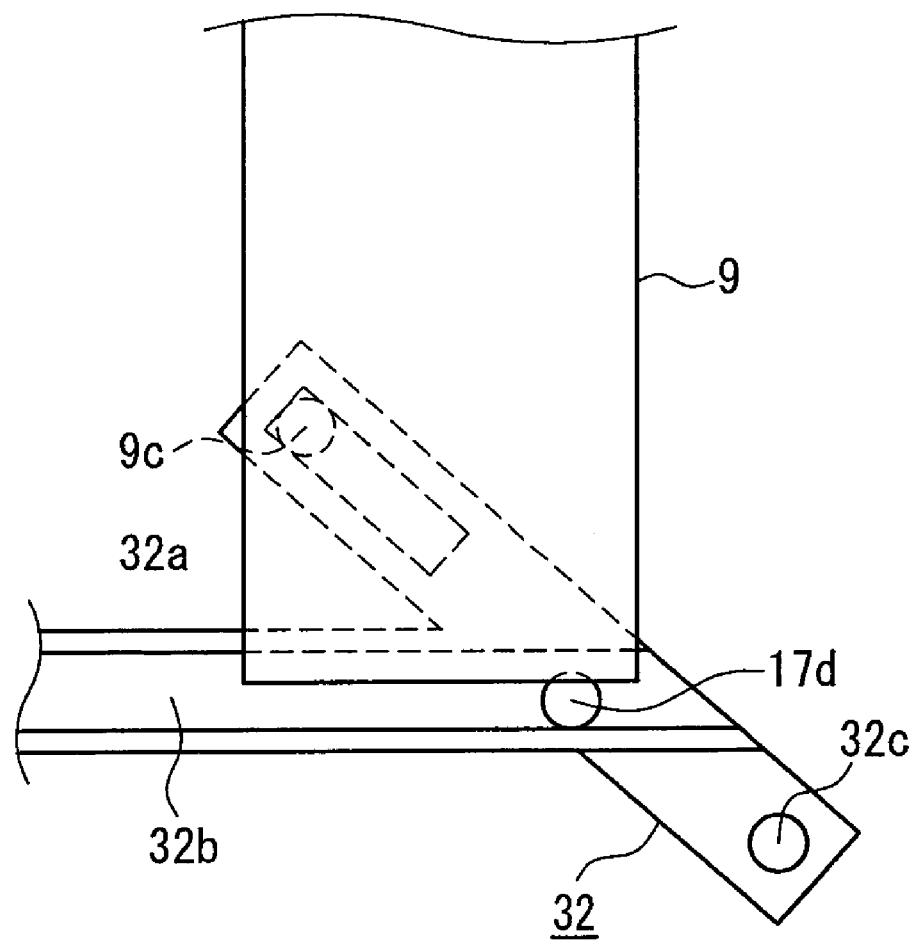
FIG. 13 is a plan view showing the main portion of a mechanism for moving an open/close member in Embodiment 1, where the open/close member is positioned to uncover the aperture.

FIGS. 11 to 13 are plan views showing a mechanism for moving the open/close member 9. In FIG. 11, the open/close member 9 is positioned to cover the aperture 3b (see FIG. 3). In FIG. 12, the open/close member 9 is shown at a position during movement. In FIG. 13, the open/close member 9 is positioned to uncover the aperture 3b. Here, only the configuration required for explaining the transfer operation is shown to make it easier to understand the drawings and the explanation.

In FIGS. 11 to 13, a pin 9c is fixed on the back of the open/close member 9.

The open/close lever 32 is pivotably supported by the axis 32c that is fixed on the back of the front cover 3 (see FIG. 3). The pin 9c is movably engaged with a slot 32a. The pin 17d that is fixed to the second rack 17 (see FIG. 3) is movably engaged with a groove 32b.

First, the second rack 17 starts moving in the direction of the arrow B (see FIG. 3) while the open/close member 9 covers the aperture 3b, as shown in FIG. 11. Then, the pin 17d engaged with the groove 32b is moved in the direction of the arrow K and presses the inner wall of the groove 32b, so that the open/close lever 32 rotates about the axis 32c in a counterclockwise direction. Since the pin 9c is movably engaged with the slot 32a, the open/close member 9 is moved in the direction of the arrow K as the open/close lever 32 rotates, resulting in the state of FIG. 12.

When the second rack 17 is moved further in the direction of the arrow B, the open/close lever 9 is pressed by the pin 17d and further rotates in the counterclockwise direction. Such rotation of the open/close lever 32 also moves the open/close member 32 further in the direction of the arrow K, resulting in the state of FIG. 13.

In the state of FIG. 13, the longitudinal direction of the groove 32b is substantially parallel to the direction of movement of the pin 17d (i.e., the direction of movement of the second rack 17). Even if the second rack 17 in the state of FIG. 13 is moved in the direction of the arrow B (see FIG. 3), the pin 17d merely slides in the groove 32b, and the open/close lever 32 does not rotate. Therefore, the movement of the open/close member 9 is stopped after it uncovers the aperture 3b (see FIG. 3).

The aperture 3b is covered with the open/close member 9 by performing the above operation in reverse order. That is, the open/close member 9 can be moved from the position shown in FIG. 13 to the position shown in FIG. 11.

In this manner, the movement of the open/close member 9 is interlocked with that of the second rack 17.

Transfer Operation of a Traverse Base 5

Figure 14:
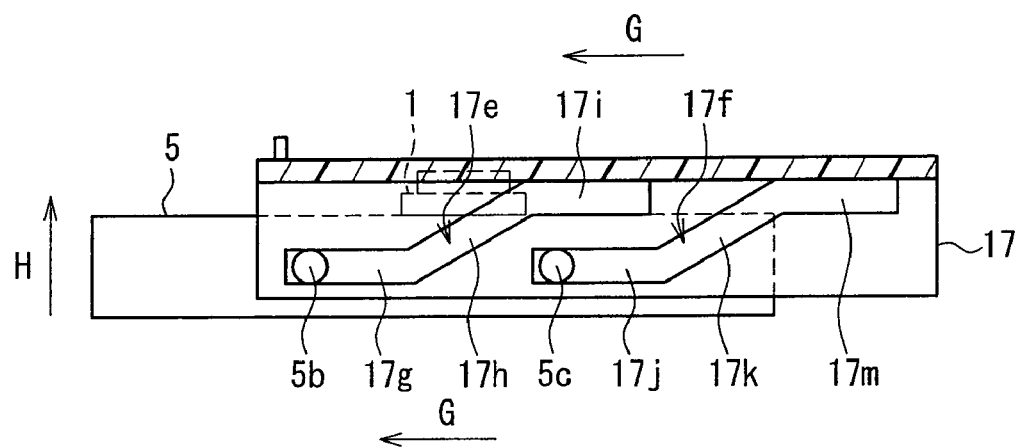
FIG. 14 is a cross-sectional view showing the main portion of a mechanism for moving a traverse base in Embodiment 1, where the traverse base is at a standby position.
Figure 15:
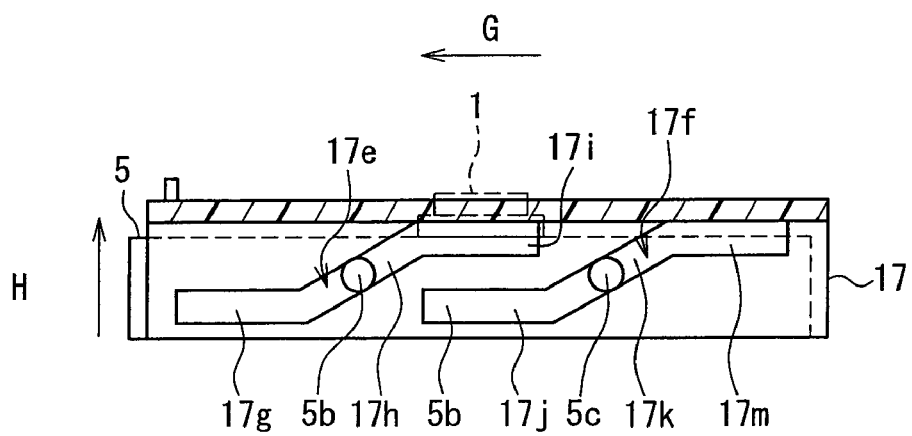
FIG. 15 is a cross-sectional view showing the main portion of a mechanism for moving a traverse base in Embodiment 1, where the traverse base is in the course of movement.
Figure 16:
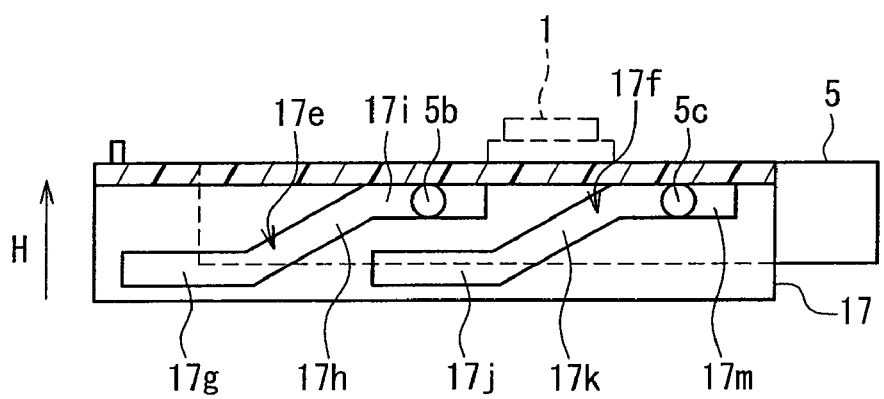
FIG. 16 is a cross-sectional view showing the main portion of a mechanism for moving a traverse base in Embodiment 1, where the traverse base is at a recording/reproducing position.

FIGS. 14 to 16 are cross-sectional views showing the main portion of a transfer mechanism of the traverse base 5, taken along the line R-R in FIG. 3. In FIG. 14, the traverse base 5 is at the standby position, which corresponds to the state of FIG. 4. In FIG. 15, the traverse base 5 is shown in the course of movement. In FIG. 16, the traverse base 5 is at the recording/reproducing position, which corresponds to the state of FIG. 7. Here, only the configuration required for explaining the transfer operation is shown to make it easier to understand the drawings and the explanation.

As shown in FIGS. 14 to 16, the second rack 17 has a substantially vertical plate portion in which cam grooves 17e, 17f are formed parallel to each other. The cam grooves 17e, 17f are substantially Z-shaped, and their shapes are the same. The cam groove 17e has flat portions 17g, 17i at both ends with different heights and an inclined portion 17h for spatially connecting the flat portions 17g and 17i. The cam groove 17f has flat portions 17j, 17m at both ends with different heights and an inclined portion 17k for spatially connecting the flat portions 17j and 17m.

Moreover, pins 5b, 5c are formed in the traverse base 5 and movably engaged with the cam grooves 17e, 17f, respectively.

In FIGS. 14 to 16, the arrow G indicating the direction of movement of the second rack 17 is oriented in the same direction as the arrow B in FIG. 3. The arrow H indicating the direction of movement of the traverse base 5 is oriented in the same direction as the arrow C in FIG. 4.

In the above configuration, when the traverse base 5 is at the standby position shown in FIG. 14, the pin 5b is located in the flat portion 17g of the cam groove 17e, and the pin 5c is located in the flat portion 17j of the cam groove 17f.

While the second rack 17 in the state of FIG. 14 is moved in the direction of the arrow G, the pins 5b, 5c are moved in the flat portions 17g, 17j to the inclined portions 17h, 17k of the cam grooves 17e, 17f, respectively, as shown in FIG. 15. The pins 5b, 5c are moved up in the inclined portions 17h, 17k and raise their relative positions with respect to the second rack 17, thereby moving the traverse base 5 in the direction of the arrow H.

When the second rack 17 is moved further in the direction of the arrow G, the pins 5b, 5c are moved from the inclined portions 17h, 17k to the flat portions 17i, 17m, as shown in FIG. 16, while the traverse base 5 is moved in the direction of the arrow H. When the pins 5b, 5c are moved into the flat portions 17i, 17m, the traverse base 5 is at the recording/reproducing position, and the turntable 1 is moved to a position where it can clamp the disc.

The traverse base 5 is moved from the recording/reproducing position to the standby position by performing the above operation in reverse order. That is, the second rack 17 is moved from the position shown in FIG. 16 in the opposite direction to the arrow G, and thus the traverse base 5 can be moved in the opposite direction to the arrow H.

In this manner, the movement of the traverse base 5 is interlocked with that of the second rack 17.

As described above, in this embodiment, when the disc 4 is placed on the disc carrying surface 3a of the front cover 3, it is supported by the centering members 8a to 8d and centered precisely by automatically aligning the center of the disc 4 with the center of the turntable 1. Therefore, accurate positioning of the disc 4 is not necessary for loading, and the disc 4 can be loaded easily.

The centering members 8a to 8d turn due to the biasing forces of the elastic members (springs 13a, 13b) and support the disc 4 by applying a uniform force from four directions, so that the disc 4 is centered relative to the outer circumference. Therefore, a mechanism for supplying a driving force to the centering members or a mechanism for halting the rotation of the centering members on completion of the centering operation can be provided simply and avoid a complicated configuration using a slip mechanism or sensor. Thus, the number of components can be reduced.

Moreover, the control members (racks 16, 17) are used not only to control the centering operation of the centering members 8a to 8d turning in the direction in which the biasing forces of the elastic members (springs 13a, 13b) act, but also to control the separation operation of the centering members 8a to 8d turning in the opposite direction to the direction in which the biasing forces of the elastic members act. Thus, the number of components can be reduced as well.

Even if it is difficult to bring the centering members 8a to 8d into contact with the racks 16, 17, the centering adjustment members 14a, 14b are at positions easily in contact with the racks 16, 17, so that the rotation of the centering members 8a to 8d can be controlled, and the configuration of the disc device can be simplified.

The gears of the centering adjustment members 14a, 14b have a larger pitch circle diameter than the gears of the centering members 8a to 8d. Therefore, a large rotation angle of the centering members can be obtained from a small rotation angle of the centering adjustment members. This can reduce the rotation angle of the centering adjustment members required for the centering operation. Thus, the amount of movement of the control members for controlling the rotation of the centering adjustment members can be reduced, and the configuration of the disc device can be smaller in size.

The movement of the open/close member 9 is interlocked with that of the second rack 17, and therefore a mechanism for opening/closing the open/close member 9 can be decreased, achieving a reduction in size, weight, and cost of the disc device.

Moreover, the movement of the traverse base 5 is interlocked with that of the second rack 17, and therefore a mechanism for moving the traverse base 5 can be decreased, achieving a reduction in size, weight, and cost of the disc device.

In this embodiment, two pairs of the centering members 8a to 8d are arranged opposite to each other, and the control members (racks) control not only the rotation of one pair in the centering direction, but also the rotation of the other pair in the direction away from the disc 4. Therefore, a control member that is designed specifically for the centering operation and controls the rotation of one pair in the centering direction, and a control member that is designed specifically for the separation operation and controls the rotation of the other pair in the direction away from the disc 4 may be provided separately.

In this embodiment, the racks (control members) 16, 17 come into contact with the centering adjustment members 14a, 14b to control the rotation of the centering adjustment members 14a, 14b, thus controlling the rotation of the centering members 8a to 8d. However, the rotation of the centering members 8a to 8d may be controlled by bringing the racks (control members) 16, 17 into direct contact with the centering members 8a to 8d.

It is also possible to provide a cartridge pressing member that increases resistance to vibration by pressing the cartridge 19 against the disc carrying surface 3a. In such a case, when the cartridge 19 is put on the disc carrying surface 3a and a recording/reproducing switch is actuated, first, the cartridge pressing member is moved to press the cartridge 19 against the disc carrying surface 3a, and then the clamp base 10 is moved. Subsequently, the operations as described in this embodiment are performed, thus making a transition to the recordable/reproducible state. For removal of the cartridge 19, after the clamp base 10 has been moved from the clamp position to the standby position shown in FIG. 3, the cartridge 19 pressed by the cartridge pressing member is released, and the cartridge pressing member is withdrawn. Then, the cartridge 19 can be taken out of the disc device. The cartridge pressing member should be withdrawn to a position where it does not interfere with the insertion/removal of the cartridge.

In this embodiment, the clamp base 10 is moved parallel to the disc carrying surface so as to clamp the disc 4 to the turntable 1. However, the disc device may have a configuration that can move the clamp base 10 linearly from a different direction or rotate the clamp base 10. The disc device also may include a mechanism for clamping the disc 4 with the turntable 1 alone, instead of the clamp base 10.

Moreover, the present invention can be applied to a disc device dedicated to a disc that can record/reproduce only a disc, a disc device that can record/reproduce only a cartridge, and a disc device that can record/reproduce both a disc and a cartridge.

The present invention is not limited to the above embodiment.

INDUSTRIAL APPLICABILITY

The disc device of the present invention allows a disc to be loaded in an easy and highly flexible manner, and therefore is useful for a stationary disc device such as a DVD player or DVD recorder, a CD player, a computer equipped with a disc drive, etc.

The invention claimed is:

1. A disc device capable of recording/reproducing information signals with respect to a disc, comprising:
a traverse base that can be moved between a recording/reproducing position and a standby position, on which an optical pickup for recording/reproducing the information signals with respect to the disc and a turntable for holding and rotating the disc at a position where the optical pickup can record/reproduce the information signals with respect to the disc are mounted;
a front cover comprising a disc carrying surface that carries the disc and an aperture that is formed in the disc carrying surface and allows the turntable to pass through when the traverse base is moved between the recording/reproducing position and the standby position; and
centering members for holding and shifting the disc to a position where a center of the disc is aligned with a center of the turntable,
wherein the centering members come into contact with the disc so that they are symmetrical about a first plane that contains the center of the turntable and is perpendicular to a disc holding surface of the turntable and a second plane that contains the center of the turntable and is substantially perpendicular to the first plane,
two pairs of the centering members are arranged symmetrically with respect to the first plane, and
each pair of the centering members is rotatable symmetrically with respect to the second plane.

2. The disc device according to claim 1, wherein a gear is provided in a part of the individual centering members, and the gears of each pair of the centering members are arranged to engage with each other.

3. The disc device according to claim 1, wherein each pair of the centering members is biased with an elastic member in a direction in which ends of the respective centering members opposed to their rotation centers move toward each other.

4. The disc device according to claim 1, further comprising:
a closing control member for controlling rotation of each pair of the centering members in a direction in which the centering members are moved toward each other; and
an opening control member for controlling rotation of each pair of the centering members in a direction in which the centering members are moved away from each other.

5. The disc device according to claim 1, further comprising:
a first control member;
a second control member; and
a driving mechanism for driving the first control member and the second control member,
wherein the first control member and the second control member are moved substantially perpendicular to a line containing the center of the turntable and a center of an optical axis of the optical pickup and in opposite directions with respect to the line,
wherein the centering members comprises a first pair of the centering members and a second pair of the centering members that come into contact with the disc so that the centering members are symmetrical about a first plane that contains the center of the turntable and a center of the optical pickup and is perpendicular to the disc holding surface of the turntable and a second plane that contains the center of the turntable and is substantially perpendicular to the first plane,
the first and second pairs of the centering members are arranged symmetrically with respect to the first plane, and
each of the first and second pairs of the centering members is rotatable symmetrically with respect to the second plane, and
wherein the first control member and the second control member are movable between (a) a first position where the first control member controls rotation of the first pair of the centering members in a centering direction while the second control member controls rotation of the second pair of the centering members in a centering direction and (b) a second position located opposite to the first position where the first control member controls rotation of the second pair of the centering members in a direction away from the disc while the second control member controls rotation of the first pair of the centering members in a direction away from the disc.

6. The disc device according to claim 5, wherein a gear is provided in a part of the individual centering members, and the gears of each pair of the centering members are arranged to engage with each other.

7. The disc device according to claim 5, wherein each pair of the centering members is biased with an elastic member in a direction in which ends of the respective centering members opposed to their rotation centers move toward each other.

8. The disc device according to claim 5, further comprising centering adjustment members, each of which has a gear engaged with a gear of one of the centering members of each pair,
   wherein the control members come into contact with the centering adjustment members to control rotation of the centering adjustment members, thus controlling the rotation of the centering members.

9. The disc device according to claim 6, wherein gears of the centering adjustment members have a larger pitch circle diameter than the gears of the centering members.

10. The disc device according to claim 5, further comprising an open/close member that can cover/uncover the aperture,
    wherein the open/close member opens and closes in relation to a movement of the first or second control member.

11. The disc device according to claim 5, wherein the first or second control member has a cam groove, and a pin is formed in the traverse base and movably engaged with the cam groove, and the cam groove is formed so that the traverse base is moved between
    the recording/reproducing position and the standby position in relation to a movement of the first or second control member.

* * * * *